(12) United States Patent
Yagi et al.

(10) Patent No.: US 11,143,915 B2
(45) Date of Patent: Oct. 12, 2021

(54) LIGHTING DEVICE INCLUDING LIGHT GUIDE PLATE AND DISPLAY DEVICE INCLUDING THE LIGHTING DEVICE

(71) Applicant: SHARP KABUSHIKI KAISHA, Sakai (JP)

(72) Inventors: Shugo Yagi, Sakai (JP); Takeshi Masuda, Sakai (JP); Satoshi Tsubooka, Sakai (JP); Yuuichi Kanbayashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/018,601

(22) Filed: Sep. 11, 2020

(65) Prior Publication Data

US 2021/0096427 A1    Apr. 1, 2021

(30) Foreign Application Priority Data

Sep. 26, 2019 (JP) .............................. JP2019-175212

(51) Int. Cl.
*G02F 1/13357* (2006.01)
*F21V 8/00* (2006.01)
*G02F 1/1335* (2006.01)

(52) U.S. Cl.
CPC ..... *G02F 1/133606* (2013.01); *G02B 6/0016* (2013.01); *G02B 6/0036* (2013.01); *G02F 1/133603* (2013.01); *G02B 6/0021* (2013.01); *G02B 6/0038* (2013.01); *G02F 1/133607* (2021.01); *G02F 1/133613* (2021.01)

(58) Field of Classification Search
CPC ......... G02F 1/133606; G02F 1/133607; G02F 1/133603; G02F 1/133611; G02F 1/133613; G02B 6/0021; G02B 6/0036; G02B 6/0038; G02B 6/0015; G02B 6/0016; G02B 6/0028; G02B 6/0043
See application file for complete search history.

(56) References Cited

U.S. PATENT DOCUMENTS

| 8,827,492 B2 * | 9/2014 | Yamamoto | ........ | G02F 1/133611 |
| | | | | 362/249.02 |
| 2009/0086508 A1 * | 4/2009 | Bierhuizen | .......... | G02B 6/0021 |
| | | | | 362/617 |

(Continued)

FOREIGN PATENT DOCUMENTS

JP        2018-106826 A      7/2018

*Primary Examiner* — Alan B Cariaso
(74) *Attorney, Agent, or Firm* — ScienBiziP, P.C.

(57) ABSTRACT

A lighting device includes light sources arranged in a row in an arrangement direction, a light guide plate disposed to cover the light sources and including a plate surface facing the light sources and an opposite plate surface opposite from the plate surface, and a light diffusion portion. A portion of the plate surface is a light entering surface and the opposite plate surface is a light exit surface. The light diffusion portion extends in the arrangement direction of the light sources and on the light exit surface such that a portion of the light diffusion portion overlaps the light sources. The light diffusion portion applies a diffusion effect to light that is within the light guide plate so as to travel in a direction crossing the arrangement direction and to be away from the light sources seen from a normal direction of the light exit surface.

14 Claims, 28 Drawing Sheets

(56) References Cited

U.S. PATENT DOCUMENTS

| | | | |
|---|---|---|---|
| 2009/0141208 A1* | 6/2009 | Byoun | G02F 1/133608 349/58 |
| 2012/0140448 A1* | 6/2012 | Nagayoshi | G02B 6/0021 362/97.3 |
| 2013/0223096 A1* | 8/2013 | Kim | G02B 6/0021 362/608 |
| 2013/0250611 A1* | 9/2013 | Lee | G02B 6/005 362/607 |
| 2019/0227382 A1 | 7/2019 | Watanabe et al. | |

* cited by examiner

FIG.9

| | COMPARATIVE EXAMPLE 2 |
|---|---|
| LIGHT DIFFUSION PORTION | NO |
| LIGHT DIFFUSION PRISM PORTION | NO |
| LED HOUSING RECESSED PORTION | YES |
| LIGHT ENTERING PRISM PORTION | YES |
| IMAGE | |
| GRAPH | |
| Cm VALUE | 0.061 |

FIG.10
| | EXAMPLE 1 |
|---|---|
| LIGHT DIFFUSION PORTION | YES |
| LIGHT DIFFUSION PRISM PORTION | YES |
| LED HOUSING RECESSED PORTION | YES |
| LIGHT ENTERING PRISM PORTION | YES |
| IMAGE | 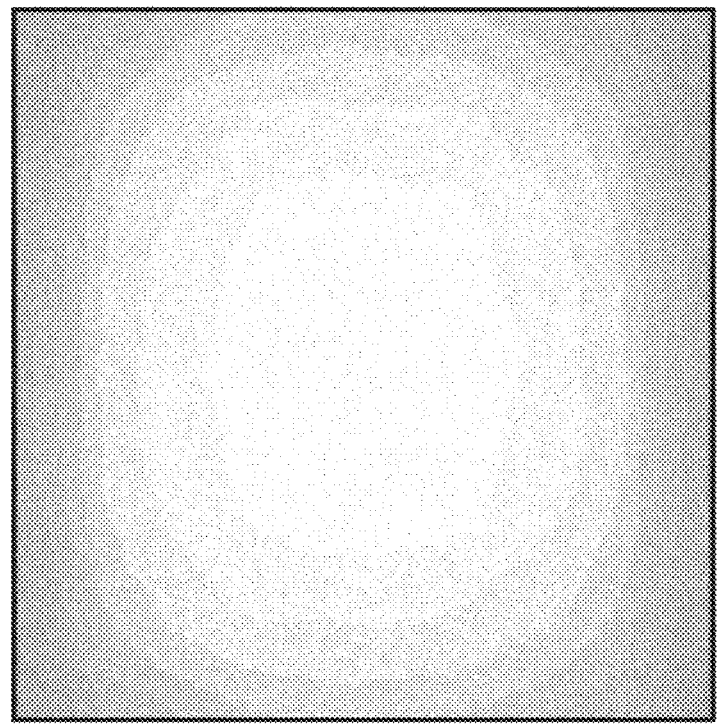 |
| GRAPH | 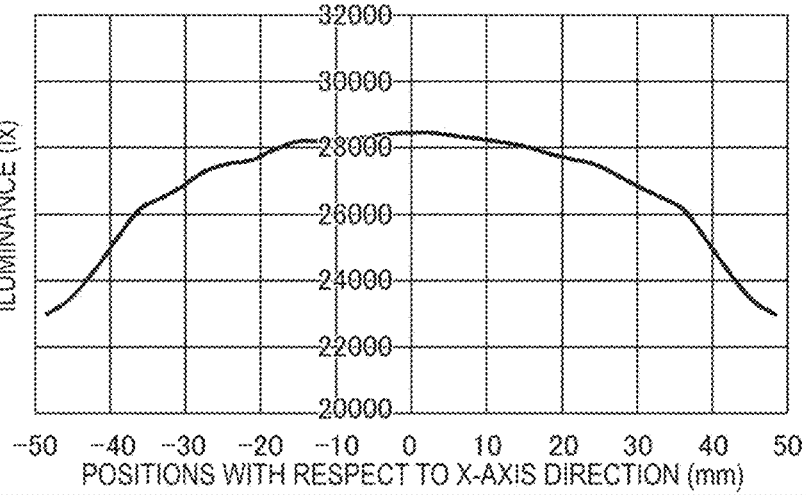 |
| Cm VALUE | 0.006 |

FIG.17

| | EXAMPLE 3 |
|---|---|
| LIGHT DIFFUSION PORTION | YES |
| LIGHT DIFFUSION PRISM PORTION | NO |
| LED HOUSING RECESSED PORTION | YES |
| LIGHT ENTERING PRISM PORTION | YES |
| IMAGE | (illuminance map, scale 20000–32000 lx) |
| GRAPH | (illuminance vs. X-axis position, -50 to 50 mm) |
| Cm VALUE | 0.011 |

FIG.27

|  | COMPARATIVE EXAMPLE 3 | EXAMPLE 8 |
|---|---|---|
| TOTAL NUMBER OF LEDS | 18,432 | 2,560 |
| THICKNESS OF BACKLIGHT DEVICE | 2.15mm | 1.87mm |
| LIGHT USE EFFICIENCY | 60% | 68% |
| DISPLAY QUALITY | GOOD | GOOD |

LIGHTING DEVICE INCLUDING LIGHT GUIDE PLATE AND DISPLAY DEVICE INCLUDING THE LIGHTING DEVICE

CROSS REFERENCE TO RELATED APPLICATION

This application claims priority from Japanese Patent Application No. 2019-175212 filed on Sep. 26, 2019. The entire contents of the priority application are incorporated herein by reference.

TECHNICAL FIELD

The technology described herein relates to a lighting device and a display device.

BACKGROUND

There has been known a backlight device for a liquid crystal display device and such a backlight device includes a light guide plate. The light guide plate includes a depressed portion provided on an opposite side of a light exit surface through which light exits, first direction changing portion, and a second direction changing portion. The first direction changing portion. is provided inside the depressed portion and above a light emitting element that is in direction directed toward the light ex surface and the light emitting element is provided on the opposite side of the light exit surface. The first direction changing portion changes a travelling direction in which at least a part of rays from the emitting element travel. The second direction changing portion is provided above the light emitting element and higher than the light exit surface and changes a travelling direction in which at least a part of light rays from the light emitting element travels. Such a backlight device is described in Japanese Unexamined Patent Application Publication No. 2018-106826.

In such a backlight device having the above configuration, as the light guide plate is reduced in thickness, luminance unevenness is less likely to occur. However, the number of light emitting elements needs to be increased to achieve further reduction in the thickness of the backlight device and less occurrence of luminance unevenness and this may increase cost. Furthermore, the second direction changing portion is made of additional material that is different from that of the light guide plate and may absorb light. This may lower light use efficiency.

SUMMARY

The technology described herein was made in view of the above circumstances. An object is to reduce the number of light sources and achieve less occurrence of luminance unevenness and reduction in thickness.

A lighting device according to the technology described herein includes light sources arranged in a row in an arrangement direction, a light guide plate disposed to cover the light sources and including a plate surface facing the light sources and an opposite plate surface being opposite from the plate surface, and a light diffusion portion. A portion of the plate surface is a light entering surface through which light emitted by the light sources enters and the opposite plate surface is a light exit surface through which the light exits. The light diffusion portion extends in the arrangement direction of the light sources and on the light exit surface such that a portion of the light diffusion portion overlaps the light sources. The light diffusion portion applies a diffusion effect to light that is within the light guide plate so as to travel in a direction crossing the arrangement direction and to be away from the light sources seen from a normal direction of the light exit surface.

According to the technology described herein, the number of light sources is reduced and luminance unevenness is less likely to occur and thickness is reduced.

BRIEF DESCRIPTION OF THE DRAWINGS

FIG. 9 is a Table illustrating experiment results of Comparative Example 2 according to Comparative Experiment 1.

FIG. 10 is a Table illustrating experiment results of Example 1 according to Comparative Experiment 1.

FIG. 17 is a Table illustrating experiment results of Example 3 according to Experimental Demonstration 3.

FIG. 27 is a Table illustrating experiment results of Comparative Example 3 and Example 8 according to Comparative Experiment 5.

DETAILED DESCRIPTION

First Embodiment

A first embodiment will be described with reference to FIGS. 1 to 15. In the present embodiment section, a liquid crystal display device 10 (a display device) and a backlight device (a lighting device) that is included in the liquid crystal display device 10 will be described as an example. The X-axis, the Y-axis and the Z-axis may be present in a part of each drawing and each of the axial directions represents a direction represented in each drawing. An upper side and a lower side in FIGS. 2, 4, and 6 correspond to a front side and a back side, respectively.

Figure 1:
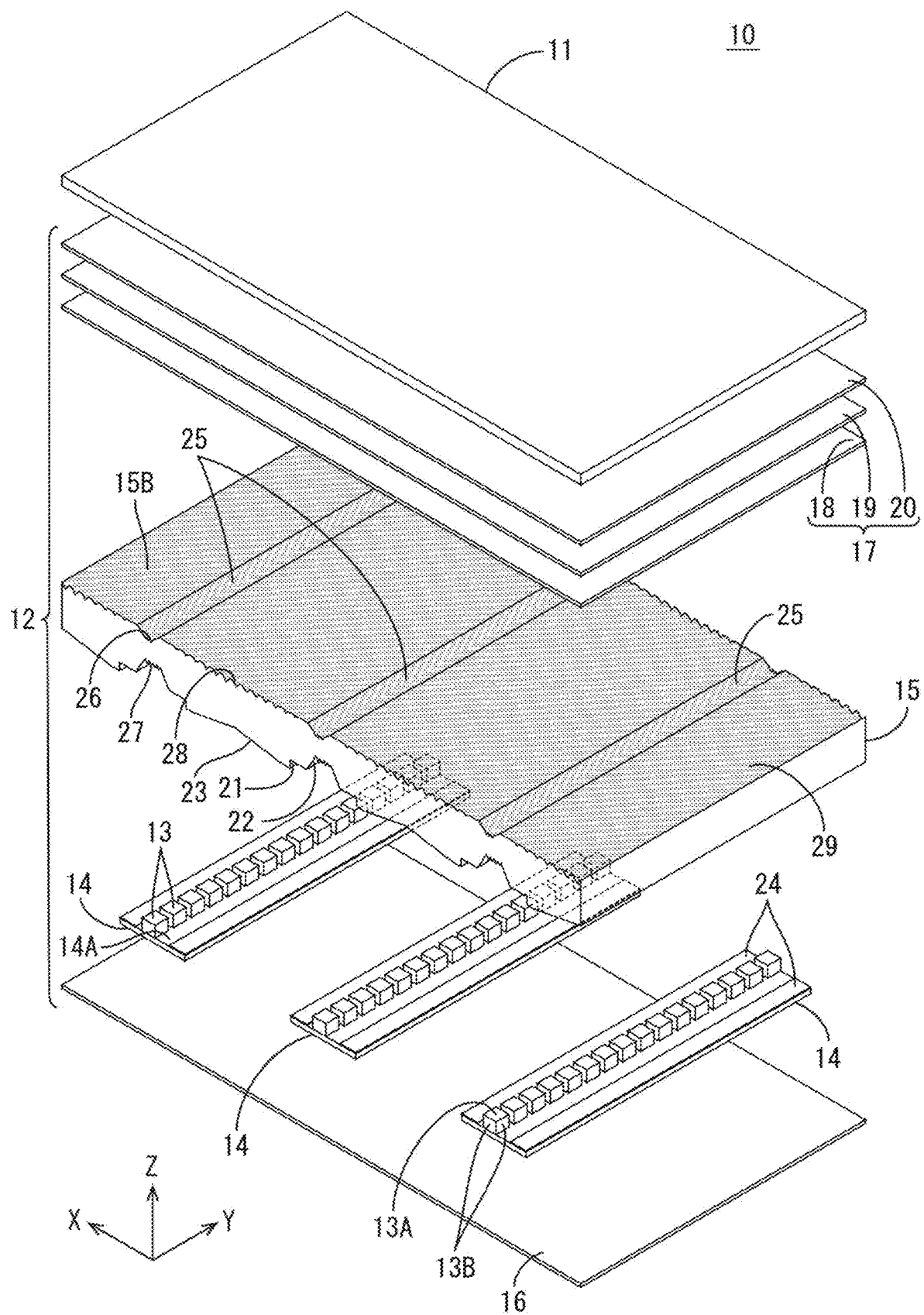
FIG. 1 is an exploded perspective view of a liquid crystal display device according to a first embodiment.

As illustrated in FIG. 1, the liquid crystal display device 10 at least includes a liquid crystal panel 11 (a display panel) and a backlight device 12. Images are displayed on the liquid crystal panel 11. The backlight device 12 is arranged on a back side of the liquid crystal panel 11 as an external light source and provides light to the liquid crystal panel 11 for displaying. The liquid crystal panel 11 includes a pair of glass substrates that are bonded to each other having a certain gap therebetween and liquid crystals that are sealed in the gap between the glass substrates. On one of the glass substrates (an array substrate, an active matrix substrate), switching components (such as TFTs), pixel electrodes that are connected to the switching components, and an alignment film are disposed. The switching components are connected to source lines and gate lines that are perpendicular to each other. On another one of the glass substrates (an opposed substrate, a CF substrate), color filters, a black matrix that defines each of the color filters, and an alignment film are disposed. The color filters includes red (R), green (G), and blue (B) color portions that are arranged in a predefined pattern. Polarizing plates are attached to outer surfaces of the glass substrates.

Next, the backlight device 12 will be described in detail. As illustrated in FIG. 1, the backlight device 12 has a laterally long rectangular shape as a whole. The long-side direction and the short-side direction correspond to the X-axis direction and the Y-axis direction, respectively, and the thickness direction corresponds to the Z-axis direction. The backlight device 12 includes LEDs 13 (light sources), LED boards 14 (light source boards) where the LEDs 13 are mounted, a light guide plate 15 through which light travels, a light reflection sheet 16 that reflects light, and optical sheets 17 (an optical member). The light guide plate 15 is disposed to cover the LEDs 13 and the LED boards 14 from a front side (a light exit side). The reflection sheet 16 is disposed on a back side (on an opposite side from the light exit side) of the LED boards 14 and the light guide plate 15. The optical sheets 17 are disposed on the front side with respect to the light guide plate 15. Thus, the backlight device 12 in the present embodiment includes the LEDs 13 directly below the liquid crystal panel 11 and is a so-called direct-type backlight device. The backlight device 12 preferably includes a chassis in which the LED boards 14 and the light guide plate 15 are arranged and a frame that holds an outer peripheral edge portions of the light guide plate 15 and the optical sheets 17. Each of the components of the backlight device 12 will be described below more in detail.

As illustrated in FIG. 1, the LED board 14 is a long film that extends in the Y-axis direction. The LED board 14 is disposed such that the length direction (a longitudinal direction) and the width direction (a short-side direction) thereof correspond to the Y-axis direction and the X-axis direction, respectively. The plate thickness direction corresponds to the Z-axis direction. The LED board 14 has a length dimension that is equal to a short-side dimension of the backlight device 12 and a width dimension that is quite smaller than a long-side dimension of the backlight device. Three LED boards 14 are arranged at intervals in the X-axis direction within the backlight device 12. One of the three LED boards 14 is disposed in a middle section of the backlight device 12 with respect to the long-side direction and other ones are disposed in the respective end sections with respect to the long-side direction. A distance between each of the LED boards 14 on the end sections and the LED board 14 on the middle section is greater than a distance between each of the LED boards 14 on the end sections and each end of the backlight device 12 with respect to the long-side direction. For example, the former distance is about double of the latter distance. Specifically, the distance between each of the LED boards 14 on the end sections and the LED board 14 on the middle section is about 20 mm and the distance between each of the LED boards 14 on the end sections and each end of the backlight device 12 with respect to the long-side direction is about 10 mm. However, the specific distances are not limited to the above examples. The LED boards 14 are disposed such that front plate surfaces thereof are opposite a back-side plate surface of the light guide plate 15 and the front plate surfaces of the LED boards 14 are mount surfaces 14A where the LEDs 13 are mounted. Wiring made of a metal film such as a copper foil is formed on each mount surface 14A of the LED board 14 and power is supplied to each of the LEDs 13 via the wiring.

As illustrated in FIG. 1, the LEDs 13 are arranged on the mount surface 14A of the LED board 14 and are arranged at certain intervals in a straight line along the length direction (the Y-axis direction) of the LED board 14. The LEDs 13 arranged on the LED board 14 configure a LED row (a light source row). The backlight device 12 includes three LED rows that are arranged at intervals with respect to the X-axis direction. In this embodiment, the arrangement direction in which the LEDs 13 of the LED row are arranged matches the Y-axis direction. The LED 13 has a block-shaped (square) outer shape and is a bare chip light source that is not packaged. In the present embodiment, the LED 13 emits light through all of outer surfaces except for a surface that is mounted on the LED board 14. The LED 13 includes a light emitting top surface 13A that faces the front side and four light emission side surfaces 13B that face the lateral side. The light emitting top surface 13A is parallel to the X-axis direction and the Y-axis direction and each of the light emission side surfaces 13B is parallel to at least the Z-axis direction. Specifically, the LEDs 13 in this embodiment are so-called mini LEDs. The LED has a vertically-long shape having the Y-axis direction dimension that is greater than the X-axis direction dimension. For example, the Y-axis direction dimension is about 0.6 mm and the X-axis direction dimension is about 0.3 mm; however, the specific dimensions are not limited to the above examples. On the mount surface 14A of the LED board 14, the LEDs 13 are arranged in the Y-axis direction at intervals each of which is about 1 mm; however, the configuration is not limited to this. The interval between the LEDs 13 with respect to the X-axis direction is same as the interval between the LED boards 14 with respect to the X-axis direction. The LEDs 13 are blue LEDs that emit light of a single color of blue. Specifically, the LED 13 includes a semiconductor made of semiconductor material such as InGaN and is configured to emit light of a single color of blue in response to the application of a forward voltage. The blue light is visible light having a blue color wavelength range (about 400 nm to about 500 nm).

As illustrated in FIG. 1, the reflection sheet 16 is a sheet having a plate surface that is parallel to the plate surfaces of the liquid crystal panel 11 and the optical sheets 17. The reflection sheet 16 is disposed to cover a substantially entire area of the LED boards 14 and the light guide plate 15 from the back side. The reflection sheet 16 is a sheet made of insulating synthetic resin and has a derivative multi-layered structure including derivative layers having different refractive indexes. The derivative multi-layered structure is a structure including the multiple derivative layers (not illustrated) that are disposed on top of each other. The derivative layers have different refractive indexes and each of the derivative layers has a thickness of ¼ of the wavelength of the visible light. Such a derivative multi-layered structure can exert high efficient reflection properties without involving diffusion. One example of the reflection sheet 16 having such a structure is "ESR" (product name) produced by 3M Japan Limited and including polyester resin as the derivative material.

As illustrated in FIG. 1, the optical sheets 17 are sheets having plate surfaces parallel to the plate surfaces of the liquid crystal panel 11 and the reflection sheet 16. The optical sheets 17 are disposed between the liquid crystal panel 11 and the light guide plate 15 with respect to the Z-axis direction (a normal direction of the plate surfaces of the optical sheets 17). Namely, the optical sheets 17 are disposed at an exit of a light travel passage of the backlight device 12. The optical sheets 17 add predetermined optical effects to the light rays emitted by the LEDs 13 and the light rays exit the optical sheets 17 toward the liquid crystal panel 11. A set of the optical sheets 17 has a back-side plate surface opposite the front-side plate surface of the light guide plate 15 as a light entering surface through which the light enters and a front-side plate surface opposite the liquid crystal panel 11 as a light exit surface through which the light exits. The optical sheets 17 include three sheets that are disposed on top of each other. The three sheets include a wavelength conversion sheet 18 (a phosphor containing sheet), a first luminance improving sheet 19 (a first prism sheet), and a second luminance improving sheet 20 (a second prism sheet) in this order from the back side (from the one closer to the LEDs 13 and the light guide plate 15). Configurations of the optical sheets 17 will be described below.

As illustrated in FIG. 1, the wavelength conversion sheet 18 is closest to the LEDs 13 among the optical sheets 17. The wavelength conversion sheet 18 includes a wavelength conversion layer (a phosphor film) and a pair of protection layers (protection films) that sandwich and protect the wavelength conversion layer from the front and back sides. The wavelength conversion layer includes phosphors (a wavelength conversion substance) for changing the wavelength of light rays from the LEDs 13. The wavelength conversion layer includes phosphors that are excited by the blue light (primary light) from the LEDs 13 and emit secondary light. The phosphors include green phosphors that emit green light as the secondary light and red phosphors that emit red light as the secondary light. The green phosphors and the red phosphors are down conversion type (down shifting type) phosphors in which the excitation wavelength is shorter than the emission wavelength. The green light is visible light having a wavelength range of green (from about 500 nm to about 570 nm) and the red light is visible light having a wavelength range of red (from about 600 nm to about 780 nm). Therefore, some of the blue light rays emitted by the LEDs 13 are converted into green light and red light through wavelength conversion by the green phosphors and the red phosphors included in the wavelength conversion sheet 18. The green light and the red light (the secondary light) that are obtained through the wavelength conversion and the blue light (the primary light) from the LEDs 13 are mixed and substantially white light exits the backlight device 12. Quantum dot phosphors are preferably used as the green phosphors and the red phosphors included in the wavelength conversion layer. The quantum dot phosphors include semiconductor nanocrystals (e.g., diameters in a range from 2 nm to 10 nm) that tightly confine electrons, electron holes, or excitons with respect to all direction of a three dimensional space to have discrete energy levels. A peak wavelength of emitting light (a color of emitting light) is freely selectable by changing the dot size. The emission light (fluorescent light) of the quantum dot phosphors has a steep peak in the light emission spectrum and the half-value width thereof is very small. Therefore, the emission light of the quantum dot phosphors has quite high color purity and large gamut. The pair of protection layers that sandwich the wavelength conversion layer are substantially transparent films made of synthetic resin and have good moisture-proof properties.

As illustrated in FIG. 1, the first luminance improving sheet 19 is disposed between the wavelength conversion sheet 18 and the second luminance improving sheet 20. The second luminance improving sheet 20 is closest to the liquid crystal panel 11 among the optical sheets 17. Each of the first luminance improving sheet 19 and the second luminance improving sheet 20 includes a substantially transparent base member and unit prisms. The transparent base member is made of synthetic resin. The unit prisms extend in the X-axis direction or the Y-axis direction and are arranged on a plate surface of the base member in a direction (the Y-axis direction or the X-axis direction) perpendicular to the extending direction. Each of the first luminance improving sheet 19 and the second luminance improving sheet 20 adds a predefined light collecting effect to the light that has entered the sheet selectively with respect to the arrangement direction in which the unit prisms are arranged. The unit prism preferably has a vertex angle of about 90 degrees. The first luminance improving sheet 19 and the second luminance improving sheet 20 are disposed such that the light collecting directions thereof are perpendicular to each other. The first luminance improving sheet 19 and the second luminance improving sheet 20 add the light collecting effect to the light exiting the backlight device 12 with respect to the X-axis direction and the Y-axis direction to improve luminance.

The light guide plate 15 is made of synthetic resin material (acrylic resin such as PMMA) that has a refractive index greatly higher than that of air and is substantially transparent. As illustrated in FIG. 1, the light guide plate 15 has a substantially plate shape and plate surfaces that are parallel to the plate surfaces of the liquid crystal panel 11 and the optical sheets 17. The light guide plate 15 is disposed such that the long-side direction and the short-side direction of the plate surface correspond to the X-axis direction and the Y-axis direction, respectively, and the thickness direction that is a normal direction of the plate surface (including a light exit surface 15B) corresponds to the Z-axis direction. The light guide plate 15 is disposed directly below the liquid crystal panel 11 and the optical sheets 17. The light guide plate 15 has a back side plate surface that is opposite the LEDs 13 and the LED boards 14 and a front side plate surface that is opposite the optical sheets 17 (the liquid crystal panel 11). Portions of the back side plate surface are light entering surfaces 15A through which the light from the LEDs 13 enters and the front side plate surface is a light exit surface 15B through which the light exits. The light emitted by the LEDs 13 enters the light guide plate 15 through the light entering surfaces 15A and travels within the light guide plate 15 in a direction along the plate surface. Then, the light exits the light guide plate 15 through the light exit surface 15B toward the front side (the light exit side) and planar light is obtained. In the following, details of the configuration of the light guide plate 15 will be described.

Figure 2:
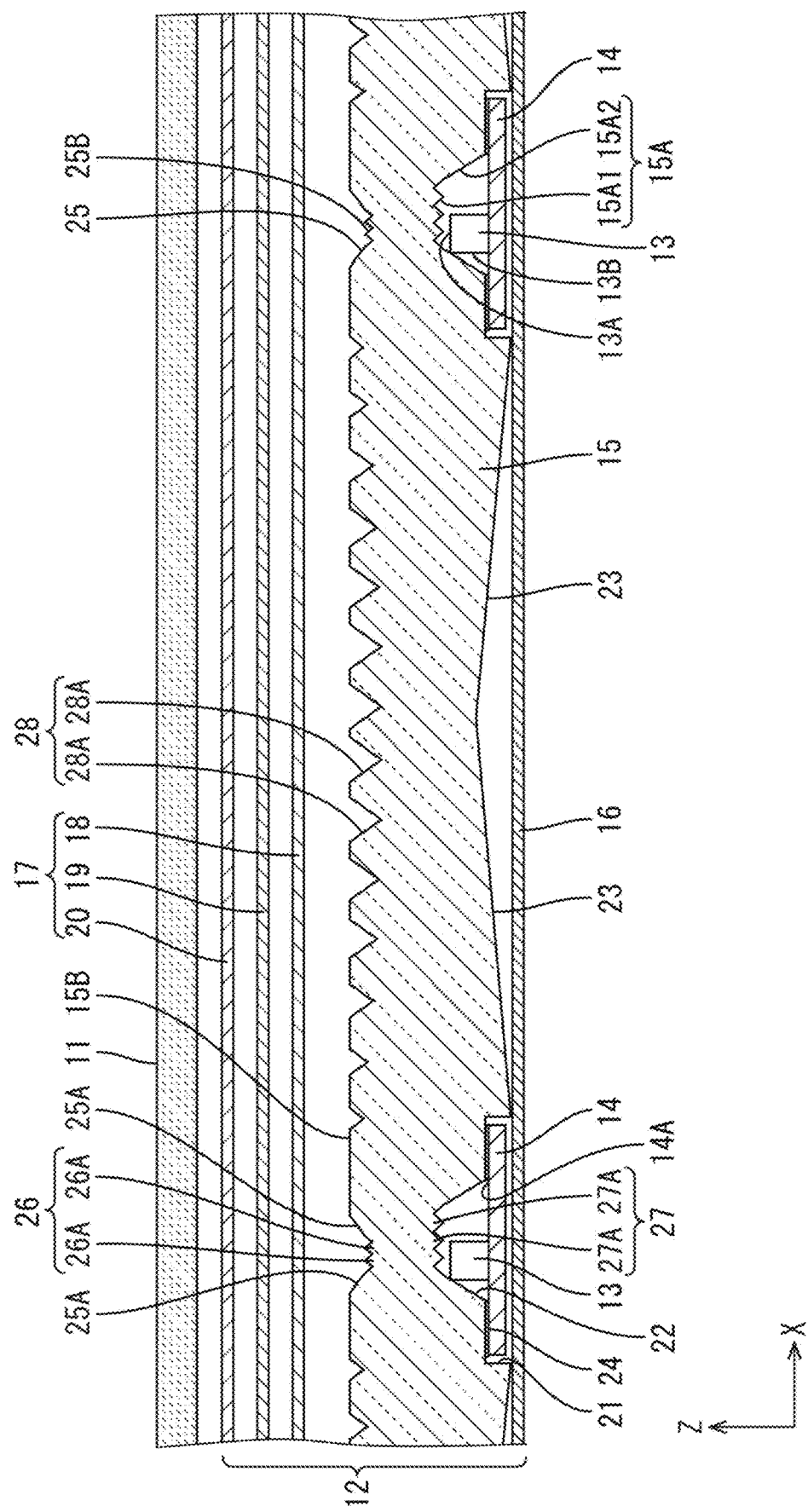
FIG. 2 is a cross-sectional view of the liquid crystal display device taken along an X-axis direction.

As illustrated in FIGS. 1 and 2, the light guide plate 15 includes recessed portions on the back side plate surface. The recessed portions are LED board housing recessed portions 21 (a light source board housing recessed portion) for housing the respective LED boards 14 and LED housing recessed portions 22 (a light source housing recessed portion) for housing the LEDs 13. The LED board housing recessed portion 21 and the LED housing recessed portion 22 are grooves that extend in the Y-axis direction and are communicated with each other. The LED board housing recessed portions 21 and the LED housing recessed portions 22 extend through the light guide plate 15 in the short-side direction thereof and are open at long-side edge surfaces of the light guide plate 15. When the LED board 14 is arranged in the LED board housing recessed portion 21, the LEDs 13 that are mounted on the LED board 14 and included in the LED row are collectively arranged in the LED housing recessed portion 22. Three LED board housing recessed portions 21 and three LED housing recessed portions 22 are formed on the back side plate surface of the light guide plate 15 at the same intervals as the LED boards 14 and the LEDs 13 are arranged with respect to the X-axis direction. The back side plate surface of the light guide plate 15 includes non-forming portions having no LED board housing recessed portions 21 and the LED housing recessed portions 22 and the non-forming portions include opposite sloped surfaces 23. The opposite sloped surfaces 23 are sloped with respect to the X-axis direction and the Z-axis direction and form a recess in the non-forming portions. The opposite sloped surfaces 23 are lowest at their edges next to the LED board housing recessed portions 21 and are sloped so as to approach the light exit surface 15B in the Z-axis direction as they extend away from the LED board housing recessed portions 21 in the X-axis direction. Two opposite sloped surfaces 23 are present between the two LED board housing recessed portions 21 and the two opposite sloped surfaces 23 are continuous to each other with their edges at a middle position between the two LED board housing recessed portions 21 and the opposite sloped surfaces 23 are highest at the edges at the middle position. The light that travels within the light guide plate 15 reflects off the opposite sloped surfaces 23 toward the front side at an angle so as to be directed almost in the Z-axis direction. This accelerates the light to exit through the light exit surface 15B.

Figure 3:
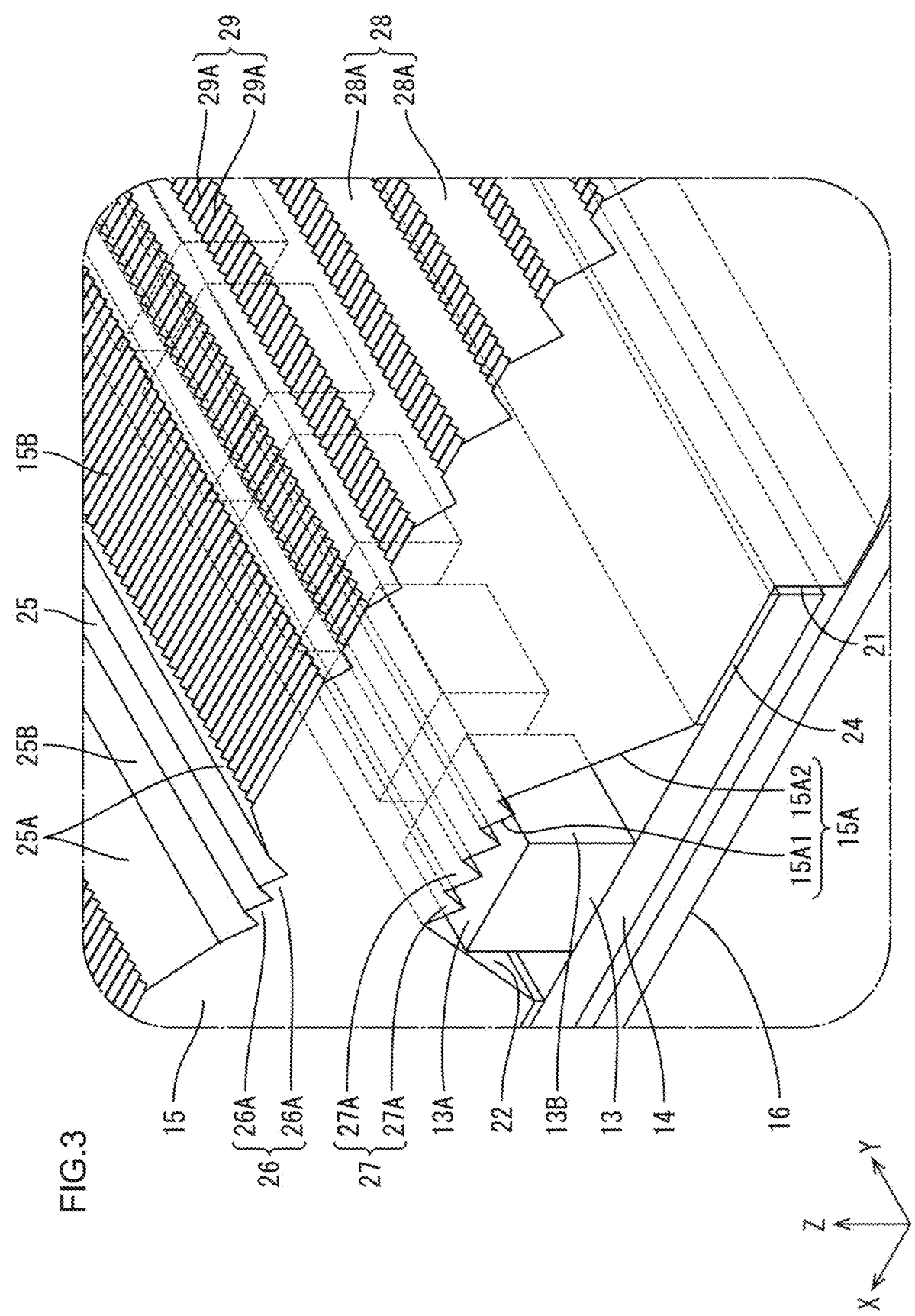
FIG. 3 is an enlarged perspective view illustrating LEDs, a LED board, and a light guide plate included in a backlight device of the liquid crystal display device.
Figure 4:
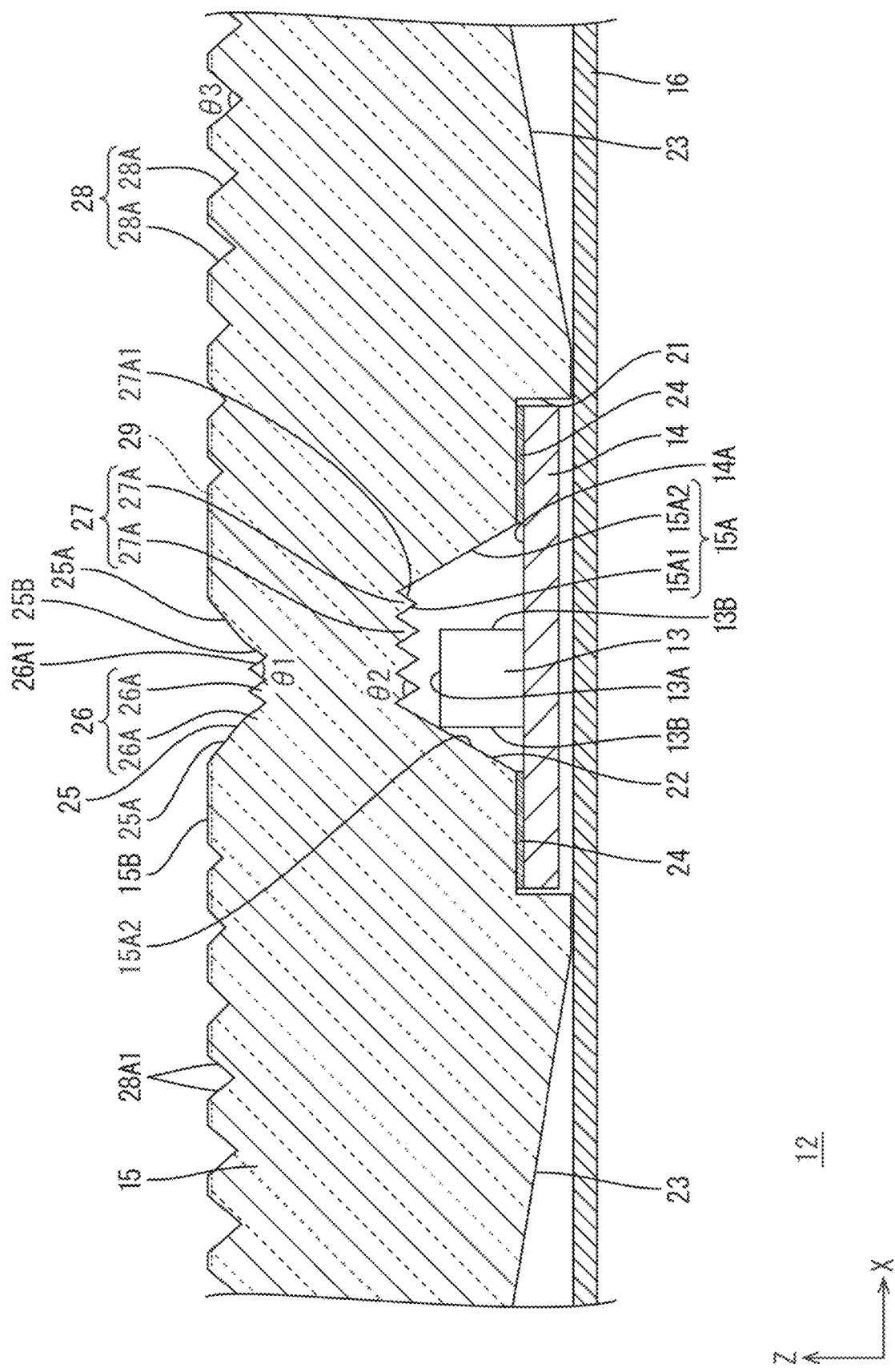
FIG. 4 is a cross-sectional view illustrating the LED, the LED board, and the light guide plate taken along the X-axis direction.

As illustrated in FIGS. 3 and 4, the LED board housing recessed portion 21 is slightly wider than the LED board 14 with respect to the X-axis direction and a fixing tape 24 is attached to a surface of the LED board housing recessed portion 21 facing the back side. The fixing tape 24 includes a base member having fixing layers on two surfaces thereof and is attached to the front side plate surface of the LED board 14. Thus, the LED board 14 is fixed to the light guide plate 15. The LED housing recessed portion 22 is much wider than a dimension of the LED 13 with respect to the X-axis direction and this allows the LEDs 13 to be arranged in the LED housing recessed portion 22 easily in the mounting operation. The inner surface of the LED housing recessed portion 22 is opposite the outer surfaces of the LEDs 13 and is a light entering surface 15A. Specifically, the inner surface of the LED housing recessed portion 22 includes a light entering top surface 15A1 that is opposite the light emitting top surface 13A of each LED 13 and light entering sloped surfaces 15A2 that are opposite the light emission side surfaces 13B of each LED 13. The light entering top surface 15A1 and the light entering sloped surfaces 15A2 extend in the Y-axis direction over an entire length of the LED board housing recessed portion 21 and configure a portion of the light entering surface 15A. The light entering top surface 15A1 crosses the light entering sloped surfaces 15A2. The light entering sloped surfaces 15A2 are sloped with respect to the X-axis direction and the Z-axis direction so as to be farther away from the light exit surface 15B in the Z-axis direction as they extend away from the light entering top surface 15A1 in the X-axis direction. Two light entering sloped surfaces 15A2 are symmetrically disposed with respect to the Z-axis direction while having the light entering top surface 15A1 therebetween. Due to the configuration of the two light entering sloped surfaces 15A2, the LED housing recessed portion 22 is reduced in the width dimension in the X-axis direction as it is closer to the light exit surface 15B in the Z-axis direction. With the light entering sloped surfaces 15A2 having such a configuration, the light that has entered the light guide plate can be angled with respect to the Z-axis direction to travel toward the light exit surface 15B. Furthermore, with the light entering sloped surfaces 15A2 that are sloped as described before, a molding die for forming the LED housing recessed portions 22 can be easily detached from an object when producing the light guide plate 15 with injection molding.

As illustrated in FIGS. 3 and 4, the light guide plate 15 in this embodiment includes light diffusion portions 25 on the light exit surface 15B. The light diffusion portion 25 extends in the Y-axis direction and at least a portion of the light diffusion portion 25 overlaps the LEDs 13 included in the LED row. The light diffusion portion 25 that extends in the Y-axis direction adds a diffusing action such that the light emitted by the LEDs 13 of the LED row and travelling within the light guide plate 15 travels in a direction to be away from the LEDs 13 of the LED row along the X-axis direction crossing the Y-axis direction seen from the Z-axis direction, which is the normal direction of the light exit surface 15B. Details will be described later. According to such a configuration, the exiting of light is suppressed in the portions of the light exit surface 15B overlapping the LEDs 13 of the LED row where the exiting of light is likely to be excessive. The exiting of light is accelerated in the portions of the light exit surface 15B not overlapping the LEDs 13 of the LED row where the exiting of light is likely to be low. Accordingly, the amount of light rays exiting through the light exit surface 15B becomes uniform within a plane surface of the light exit surface 15B and this suppresses occurrence of luminance unevenness. Since occurrence of the luminance unevenness is suppressed effectively, the whole backlight device 12 can be reduced in thickness. Furthermore, when light is emitted by certain LEDs 13 of the LEDs 13 included in the LED row and light is not emitted by the rest of the LEDs 13, the light diffusion portion 25 adds the above diffusing action only to the light emitted by the certain LEDs 13. Therefore, the light is likely to exit through the portions of the light exit surface 15B near the LEDs 13 that emit light with respect to the Y-axis direction and the light is less likely to exit through the portions near the LEDs 13 that do not emit light. Accordingly, such a configuration is preferable in performing so-called local dimming control and high dynamic range (HDR) control. Furthermore, the light emitted by the LEDs 13 arranged in a row is converted into planar light by the light guide plate 15 and the planar light exits through the light exit surface 15B. The configuration is preferable in reducing the number of LEDs 13.

The configuration of the light diffusion portion 25 will be described in detail. As illustrated in FIGS. 3 and 4, the light diffusion portion 25 is formed by forming a recess in a portion of the light exit surface 15B overlapping the LEDs 13 included in the LED row. The light diffusion portion 25 includes light exit sloped surfaces 25A on an inner surface thereof. The light exit sloped surfaces 25A are sloped obtusely with respect to the light exit surface 15B. Specifically, the light exit sloped surface 25A is sloped with respect to the X-axis direction and the Z-axis direction so as to be away from the LEDs 13 and approach the light exit surface 15B in the Z-axis direction as it extends away from the LEDs 13 included in the LED row in the X-axis direction. When the light travelling within the light guide plate 15 totally reflects off the light exit sloped surfaces 25A, the light is diffused to travel away from the LEDs 13 of the LED row along the X-axis direction and travels toward an opposite side from the light exit surface 15B. Compared to a configuration including a structure for absorbing light as the light diffusion portion, the loss of light is suppressed while keeping high light use efficiency and occurrence of luminance unevenness is preferably suppressed. The light diffusion portion 25 is a recessed portion on the light exit surface 15B. Therefore, compared to a configuration including the light diffusion portion as a protrusion on the light exit surface 15B, a greater amount of the light rays to which the diffusing action is added can travel in a direction so as to be away from the LEDs 13 of the LED row in the X-axis direction. This preferably suppresses occurrence of luminance unevenness. The light diffusion portion 25 includes a bottom surface 25B on the inner surface thereof and the bottom surface 25B is continuous to lower side (bottom side) edges of the light exit sloped surfaces 25A. Two light exit sloped surfaces 25A are disposed symmetrically while having the bottom surface 25B therebetween with respect to the X-axis direction. The light diffusion portion 25 becomes narrower in the X-axis direction dimension as it becomes closer to the LEDs 13 in the Z-axis direction and the light diffusion portion 25 becomes wider in the X-axis direction dimension as it becomes closer to the light exit surface 15B due to the configuration of the two light exit sloped surfaces 25A. The light exit sloped surfaces 25A and the bottom surface 25B extend in the Y-axis direction over the entire length of the light diffusion portion 25.

As illustrated in FIGS. 3 and 4, the light diffusion portion 25 includes a light diffusion prism portion 26 on the bottom surface 25B. The light diffusion prism portion 26 extends along the Y-axis direction and includes light diffusion unit prisms 26A that are arranged in the X-axis direction (a direction crossing the arrangement direction). The light diffusion prism portion 26 is a so-called prism type lens and the light diffusion unit prism 26A is a protrusion type prism and protrudes from the bottom surface 25B of the light diffusion portion 25 toward the front side. The light diffusion unit prism 26A has a substantially triangular (substantially mountain shape) cross sectional shape taken along the X-axis direction and extends linearly along the Y-axis direction over the entire length of the light diffusion portion 25. The light diffusion unit prism 26A has a width dimension (the X-axis direction dimension) that is constant over the entire length in the longitudinal direction (the Y-axis direction). The light diffusion unit prism 26A has a substantially isosceles triangular cross-sectional shape and includes a pair of sloped surfaces 26A1. The vertex angle θ1 between the pair of sloped surfaces 26A1 is preferably between 45° and 115°, inclusive, and is most preferably 60°. The light diffusing unit prisms 26A that are arranged along the X-axis direction have the same vertex angle θ1, the same width dimension of the bottom surface (an arrangement interval), and the same height dimension. With the light diffusion prism portion 26, some of the light rays that travel within the light guide plate 15 reach the bottom surface 25B of the light diffusion portion 25 and most of the light rays that have reached the bottom surface 25B totally reflect off the sloped surfaces 26A1 of the light diffusion unit prisms 26A. Then, the light rays that are totally reflected are diffused to travel in a direction so as to be away from the LEDs 13 of the LED row along the X-axis direction and travel toward an opposite side from the light exit surface 15B. Particularly, since the bottom surface 25B of the light diffusion portion 25 is present directly above the LEDs 13 of the LED row, a large amount of light rays that emitted by the LEDs 13 through the light emitting top surfaces 13A and travel along the Z-axis direction and have high light emission intensity are supplied to the bottom surface 25B. The diffusion action is added to the light rays having high light emission intensity by the light diffusion prism portion 26. Thus, the portions of the light exit surface 15B overlapping the LEDs 13 of the LED rows are less likely to be recognized as local bright portions. This preferably suppresses occurrence of luminance unevenness. Furthermore, the light diffusion prism portion 26 is configured such that the vertex angle θ1 of each light diffusion unit prism 26A is between 45° and 115°, inclusive. Therefore, the light diffusion prism portion 26 can add the diffusion action to the light effectively and occurrence of luminance unevenness is further preferably suppressed.

As illustrated in FIGS. 3 and 4, the LED housing recessed portion 22 includes a light entering prism portion 27 on the light entering top surface 15A1. The light entering prism portion 27 includes light entering unit prisms 27A that extend along the Y-axis direction and are arranged in the X-axis direction. The light entering prism portion 27 is a so-called prism type lens. The light entering unit prism 27A protrudes from the light entering top surface 15A1 of the LED housing recessed portion 22 toward the back side and is a protrusion type prism. The light entering unit prism 27A has a substantially isosceles triangular cross-sectional shape and includes a pair of sloped surfaces 27A1. The vertex angle θ2 between the pair of sloped surfaces 27A1 is preferably between 75° and 85°, inclusive, and is most preferably 80°. The light entering unit prisms 27A that are arranged along the X-axis direction have the same vertex angle θ2, the same width dimension of the bottom surface (an arrangement interval), and the same height dimension. With such a configuration, the light that is emitted by the LEDs 13 and enters through the light entering top surface 15A1 of the LED housing recessed portion 22 can be spread in the X-axis direction by the light entering unit prisms 27A of the light entering prism portion 27 and travel toward the light exit surface 15B. Accordingly, a greater amount of the light rays can travel in a direction so as to be away from the LEDs 13 of the LED row along the X-axis direction. Particularly, since the light entering top surface 15A1 of the LED housing recessed portion 22 is present directly above the LEDs 13 of the LED row, a large amount of light rays that are emitted by the LEDs 13 through the light emitting top surfaces 13A and travel along the Z-axis direction and have high light emission intensity are supplied to the light entering top surface 15A1. The diffusion action is added to the light rays having high light emission intensity by the light entering prism portion 27. Therefore, the portions of the light exit surface 15B overlapping the LEDs 13 of the LED rows are less likely to be recognized as local bright portions. This preferably suppresses occurrence of luminance unevenness. Furthermore, the light entering prism portion 27 is configured such that the vertex angle θ2 of each light entering unit prism 27A is between 75° and 85°, inclusive. Therefore, the light entering prism portion 27 can add the diffusion action to the light effectively and occurrence of luminance unevenness is further preferably suppressed.

Furthermore, as illustrated in FIG. 4, the light entering sloped surface 15A2, which is a portion of the inner surface of the LED housing recessed portion 22, is in contact with the LEDs 13 of the LED row such that the light guide plate 15 can be positioned with respect to the LEDs 13 included in the LED row in the X-axis direction (the crossing direction that crosses the arrangement direction seen from the normal direction of the light exit surface 15B). Specifically, the light entering sloped surface 15A2 that is on the left in FIG. 4 and included as a portion of the inner surface of the LED housing recessed portion 22 is in contact with an upper left corner portions of the LEDs 13 illustrated in FIG. 4. In such a contact state, the LEDs 13 are locally disposed on the left side within the LED housing recessed portion 22 with respect to the X-axis direction as illustrated in FIG. 4 and a center of the light entering top surface 15A1 is off from a center of each LED 13 with respect to the X-axis direction. On the other hand, in the contact state, the light diffusion portion 25 is disposed such that a center thereof corresponds to the center of the LEDs 13 that are in contact with the light entering sloped surface 15A2 of the LED housing recessed portion 22 with respect to the Z-axis direction. Namely, the light diffusion portion 25 is disposed such that a center of the bottom surface 25B and a center of the light diffusion prism portion 26 correspond to the center of the LEDs 13 with respect to the Z-axis direction. According to such a configuration, the light emitted by the LEDs 13 included in the LED row can be evenly diffused in both sides by the light diffusion portion 25 to travel in a direction so as to be away from the LEDs 13 along the X-axis direction. This preferably suppress occurrence of luminance unevenness.

Figure 5:
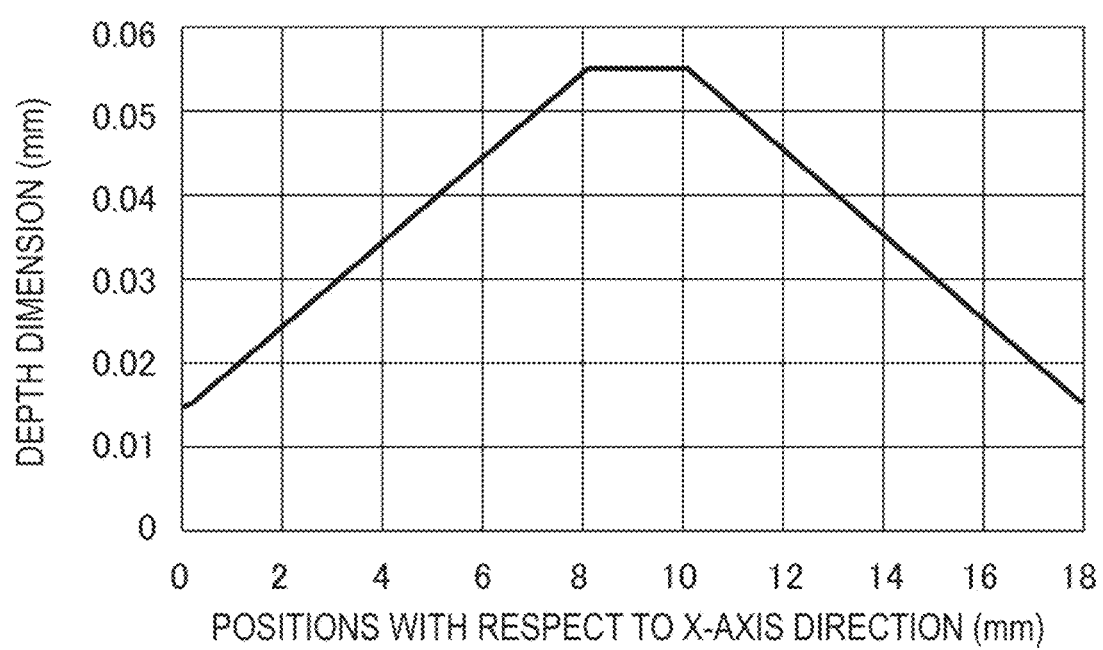
FIG. 5 is a graph illustrating relations of a depth dimension and a position in the X-axis direction of a first light exit unit prism of a first light exit prism portion included in the light guide plate.

As illustrated in FIGS. 3 and 4, the light guide plate 15 includes a first light exit prism portion 28 on the light exit surface 15B such that the first light exit prism portion 28 does not overlap the light diffusion portion 25 and the LEDs 13 included in the LED rows. The first light exit prism portion 28 includes first light exit unit prisms 28A that extend along the Y-axis direction and are arranged in the X-axis direction (a direction crossing the arrangement direction). The first light exit prism portion 28 is a so-called prism type lens. The first light exit unit prism 28A is a recessed type prism and is recessed from the light exit surface 15B of the LED housing recessed portion 22 toward the back side. The first light exit unit prism 28A has a substantially triangular cross-sectional shape (a substantially mountain shape) taken along the X-axis direction. The first light exit unit prism 28A extends linearly along the Y-axis direction over an entire length of the light guide plate 15. The first light exit unit prism 28A has a substantially isosceles triangular cross-sectional shape and includes a pair of sloped surfaces 28A1. The vertex angle θ3 between the pair of sloped surfaces 28A1 is preferably 90°. The first light exit unit prisms 28A of the first light exit prism portion 28 are arranged on two sides of the light diffusion portion 25 with respect to the X-axis direction so as to be away from the light diffusion portion 25 at a space (for example, about 1 mm). The first light exit unit prisms 28A that are arranged along the X-axis direction have the same vertex angle θ3 and the same arrangement interval. The width dimension of the bottom surface, the length (area) and the depth dimension of the sloped surface 28A1 ranging from the bottom surface to the top are varied according to the position of each of the first light exit unit prisms 28A in the X-axis direction. Specifically, in the first light exit unit prisms 28A, the width dimension of the bottom surface, the area and the depth dimension of the sloped surface 28A1 tend to be decreased as the position of the first light exit unit prism 28A is closer to the light diffusion portion 25 and they tend to be increased as the position is farther away from the light diffusion portion 25. On the light exit surface 15B of the light guide plate 15, the width dimension of the bottom surface of the first light exit unit prism 28A, the area and the depth dimension of the sloped surface 28A1 are greatest at the position where the distance from the light diffusion portion 25 in the X-axis direction is greatest (the position where the adjacent two opposite sloped surfaces 23 are continuous to each other with their edges at the highest position). Specifically, the first light exit unit prisms 28A are arranged at an equal interval that is about 0.1 mm, for example, and the depth dimension of the first light exit unit prisms 28A is varied within the range from 0.015 mm to 0.055 mm, inclusive. Specific relations of the depth dimensions of the first light exit unit prisms 28A and the position in the X-axis direction are illustrated in FIG. 5. In FIG. 5, the vertical axis represents the depth dimensions (the unit is mm) of the first light exit unit prisms 28A and the horizontal axis represents the positions (the unit is mm) of the first light exit unit prisms 28A with respect to the X-axis direction. The position of the first light exit unit prism 28A that is closest to the LED 13 included in a certain LED row with respect to the X-axis direction is defined as a reference position (0) on the horizontal axis in FIG. 5. According to FIG. 5, the first light exit unit prism 28A that is closest to the LED 13 has the smallest value of the depth dimension, which is 0.015 mm, and the depth dimension of the first light exit unit prism 28A is increased as the position becomes farther away from the LED 13. The depth dimension of the first light exit unit prism 28A is greatest, which is 0.055 mm, at the position that is away from the first light exit unit prism 28A closest to the LED 13 by about 8 mm.

According to such a configuration, among the light rays that have traveled within the light guide plate 15 and reached the first light exit unit prisms 28A, light rays entering through the sloped surfaces 28A1 of the first light exit unit prisms 28A at an incident angle not greater than a critical angle exits the light guide plate 15 and light rays entering through the sloped surfaces 28A1 at an incident angle greater than the critical angle are totally reflected by the sloped surfaces 28A1 and travel at least in a direction so as to be away from the light exit surface 15B. The light rays that have totally reflected by the sloped surfaces 28A1 of the first light exit unit prisms 28A are reflected by the opposite sloped surfaces 23 or reflected by the reflection sheet 16 and retro-reflection light rays that travel toward the light exit surface 15B again are obtained. The retro-reflection light rays exit through the sloped surfaces 28A1 of the first light exit unit prisms 28A. The amount of exit light rays is proportional to the area of the sloped surface 28A1. The first light exit prism portion 28 is disposed not to overlap the light diffusion portion 25 and the LEDs 13 included in the LED row as described above. With such a configuration, the first light exit prism portion 28 does not accelerate light rays to exit through the portions of the light exit surface 15B of the light guide plate 15 overlapping the LEDs 13 of the LED row but accelerates light rays to exit through the portions of the light exit surface 15B not overlapping the LEDs 13 of the LED row. Furthermore, the first light exit unit prisms 28A are configured such that the area of the sloped surface 28A1 is increased as the position is farther away from the light diffusion portion 25 in the X-axis direction. According to such a configuration, light rays are less likely to exit the portion of the light guide plate 15 near the light diffusion portion 25 where the amount of light rays is likely to be great and light rays are accelerated to exit the portions of the light guide plate 15 farther away from the light diffusion portion 25 where the amount of light rays is likely to be small. Thus, luminance unevenness is preferably suppressed.

Moreover, as illustrated in FIGS. 3 and 4, in this embodiment, the first light exit unit prisms 28A of the first light exit prism portion 28 are arranged at intervals each of which is greater than the greatest value of the width dimension of the bottom surface. According to such a configuration, the light rays that have totally reflected by the sloped surfaces 28A1 of the first light exit unit prism 28A can travel in the X-axis direction much farther away from the LEDs 13 included in the LED row compared to a configuration in which the first light exit unit prism is formed on the light exit surface 15B as a protrusion protruding toward the front side. Accordingly, the light is much likely to exit through the portions of the light exit surface 15B not overlapping the LEDs 13 and luminance unevenness is suppressed more effectively. Particularly, since the vertex angle θ3 of the first light exit unit prism 28A is 90°, the recycling efficiency of light rays that have totally reflected by the sloped surfaces 28A1 can be maximized and the configuration is excellent in view of the use efficiency of light.

Figure 6:
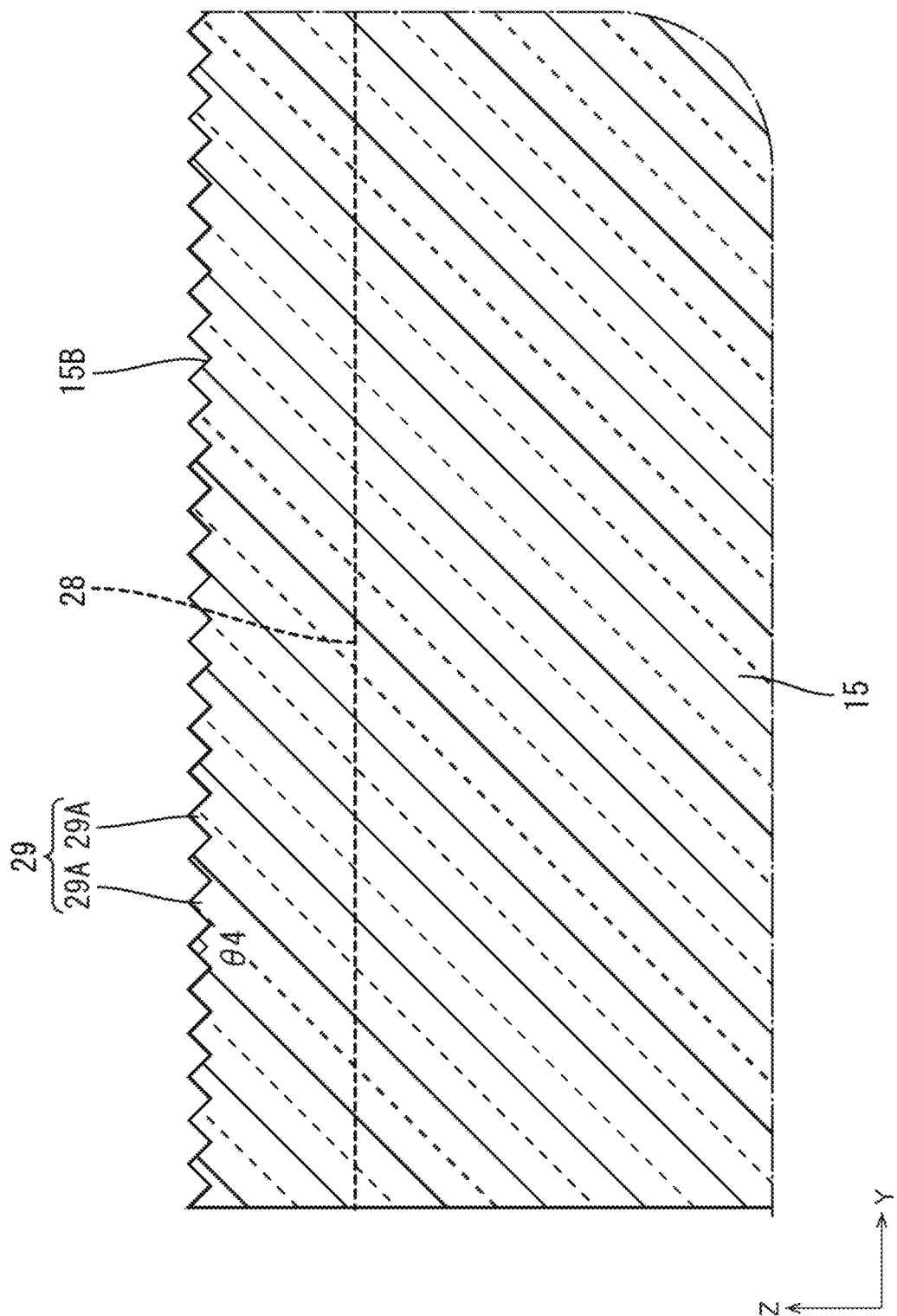
FIG. 6 is a cross-sectional view of the light guide plate taken along a Y-axis direction.

As illustrated in FIGS. 3, 4, and 6, the light guide plate 15 includes a second light exit lens portion 29 on the light exit surface 15B such that the second light exit lens portion 29 does not overlap the light diffusion portion 25 and the LEDs 13 included in the LED rows. The second light exit lens portion 29 includes second light exit unit prisms 29A (a second light exit unit lens) that extend along the X-axis direction (a direction crossing the arrangement direction) and are arranged in the Y-axis direction. The second light exit lens portion 29 is a so-called prism type lens. The second light exit unit prism 29A protrudes from the light exit surface 15B of the light guide plate 15 toward the front side and is a protrusion type prism. The second light exit unit prism 29A has a substantially triangular cross-sectional shape (a substantially mountain shape) taken along the Y-axis direction and extends linearly along the X-axis direction over the entire length of the light guide plate 15. The second light exit unit prism 29A has a width dimension (the dimension in the Y-axis direction) that is constant over an entire length thereof in the longitudinal direction (the X-axis direction). The second light exit unit prism 29A has a substantially isosceles triangular cross-sectional shape and includes a pair of sloped surfaces 29A1. The vertex angle θ4 between the pair of sloped surfaces 29A1 is preferably between 75° and 90°, inclusive, and is most preferably 90°. The second light exit unit prisms 29A that are arranged along the Y-axis direction have the same vertex angle θ4, the same width dimension of the bottom surface (an arrangement interval), and the same height dimension. Specifically, the second light exit unit prisms 29A are arranged at equal intervals each of which is about 0.013 mm, for example, and the depth dimension of the second light exit unit prisms 29A is constant and is about 0.065 mm, for example. However, the values are not limited to the above examples.

According to such a configuration, most of the light rays that have traveled within the light guide plate 15 and reached the second light exit unit prisms 29A are reflected by the sloped surfaces 29A1 of the second light exit unit prisms 29A and travel in the Y-axis direction so as to be farther away from the light exit surface 15B. The light rays that have totally reflected by the sloped surfaces 29A1 of the second light exit unit prisms 29A are reflected by the opposite sloped surfaces 23 or reflected by the reflection sheet 16 and retro-reflection light rays that travel toward the light exit surface 15B again are obtained. The retro-reflection light rays exit through the sloped surfaces 28A1 of the first light exit unit prism 28A. Thus, the light rays travelling within the light guide plate 15 can be mixed with respect to the Y-axis direction and this suppresses luminance unevenness effectively. Particularly, since the vertex angle θ4 of the second light exit unit prism 29A is 90°, the light is less likely to be diffused excessively in the Y-axis direction. This is preferable for performing the local dimming control and the HDR control and the recycling efficiency of light rays that have totally reflected by the sloped surfaces 29A1 can be maximized and the configuration is excellent in view of the use efficiency of light. Moreover, in the second light exit lens portion 29, the depth dimension of the second light exit unit prism 29A is smaller than the depth dimension of the first light exit unit prism 28A. According to such a configuration, the sloped surface 28A1 of the first light exit unit prism 28A can have a larger area compared to a configuration in which the relations of the depth dimensions of the unit prisms are opposite from the above ones. With such a configuration, the amount of light rays that exit through the sloped surface 28A1 of the first light exit unit prism 28A can be increased and this increases the light use efficiency.

Figure 7:
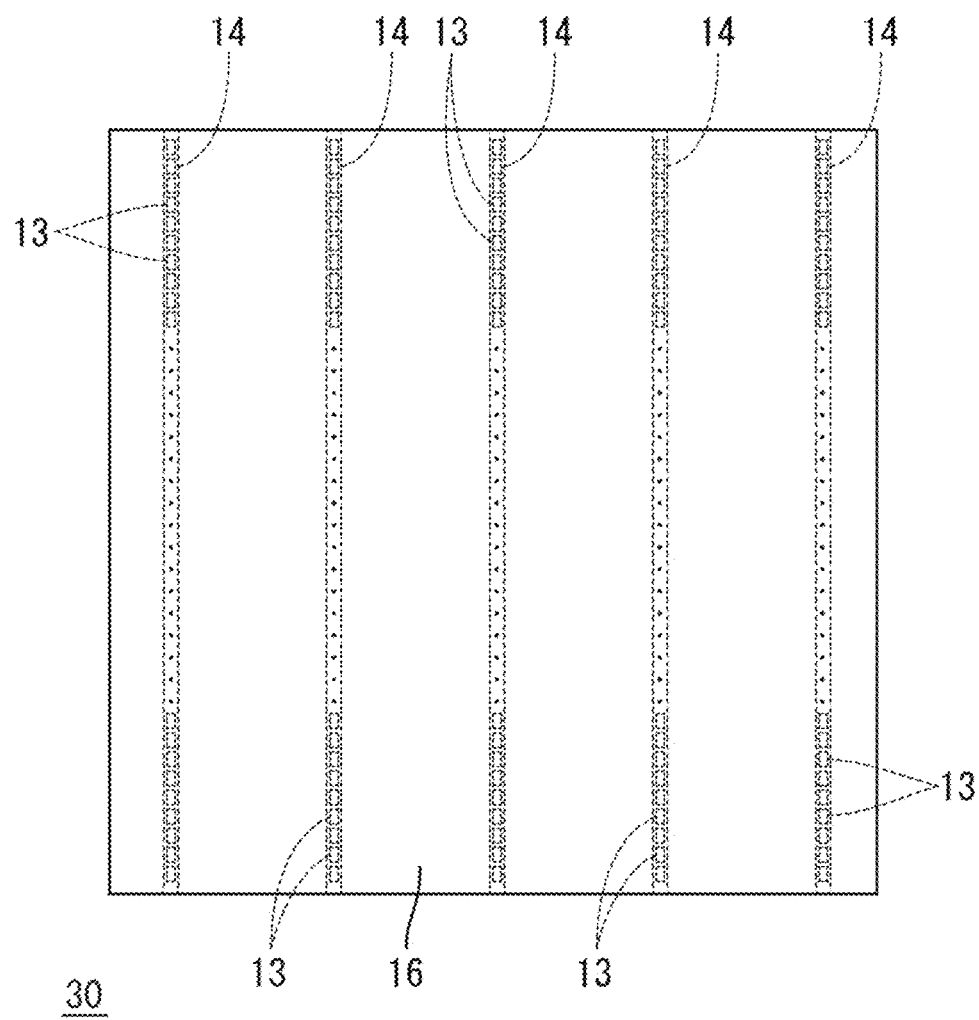
FIG. 7 is a bottom view of a backlight device according to Comparative Experiment 1.

Next, Comparative Experiments 1 to 4 and Experimental Demonstrations 1 and 2 were performed to test superiority of the backlight device 12 and the liquid crystal display device 10 according to this embodiment. Comparative Experiments 1 to 4 and Experimental Demonstrations 1 and 2, and the results thereof will be described in sequence. First, in Comparative Experiment 1, a backlight device 30 including a configuration described in FIG. 7 is prepared as Example 1. The backlight device 30 in Example 1 has a substantially square plan view outline shape and includes five LED boards 14. More specifically, a dimension of each side of the backlight device 30 is about 100 mm and each of the LED boards 14 includes 100 LEDs 13 that are arranged at intervals of 1 mm. The backlight device of Example 1 has the same configuration as that described before this paragraph except for the above-described configuration. Specifically, the vertex angle θ1 of the light diffusion unit prism 26A of the light diffusion prism 26 is 60°, the vertex angle θ2 of the light entering unit prism 27A of the light entering prism 27 is 80°, the vertex angle θ3 of the first light exit unit prism 28A of the first light exit prism portion 28 is 90°, and the vertex angle θ4 of the second light exit unit prism 29A of the second light exit prism portion 29 is 90°. The backlight device having the outline shape and the number of LED boards 14 same as those of Example 1 and having the configuration of Example 1 without including the light diffusion portion 25, the light diffusion prism portion 26, and the light entering prism portion 27 is prepared as Comparative Example 1. Further, the backlight device having the outline shape and the number of LED boards 14 same as those of Example 1 and having the configuration of Example 1 without including the light diffusion portion 25 and the light diffusion prism portion 26 is prepared as Comparative Example 2. In Comparative Experiment 1, for each of the backlight devices of Example 1, Comparative Examples 1 and 2, an image that represents an illuminance distribution of the exit light rays was taken while all of the LEDs being lighted and illuminance of the exit light was measured and a graph relating the illuminance distribution was obtained and Michelson Contrast (Cm) values were measured.

Figure 8:
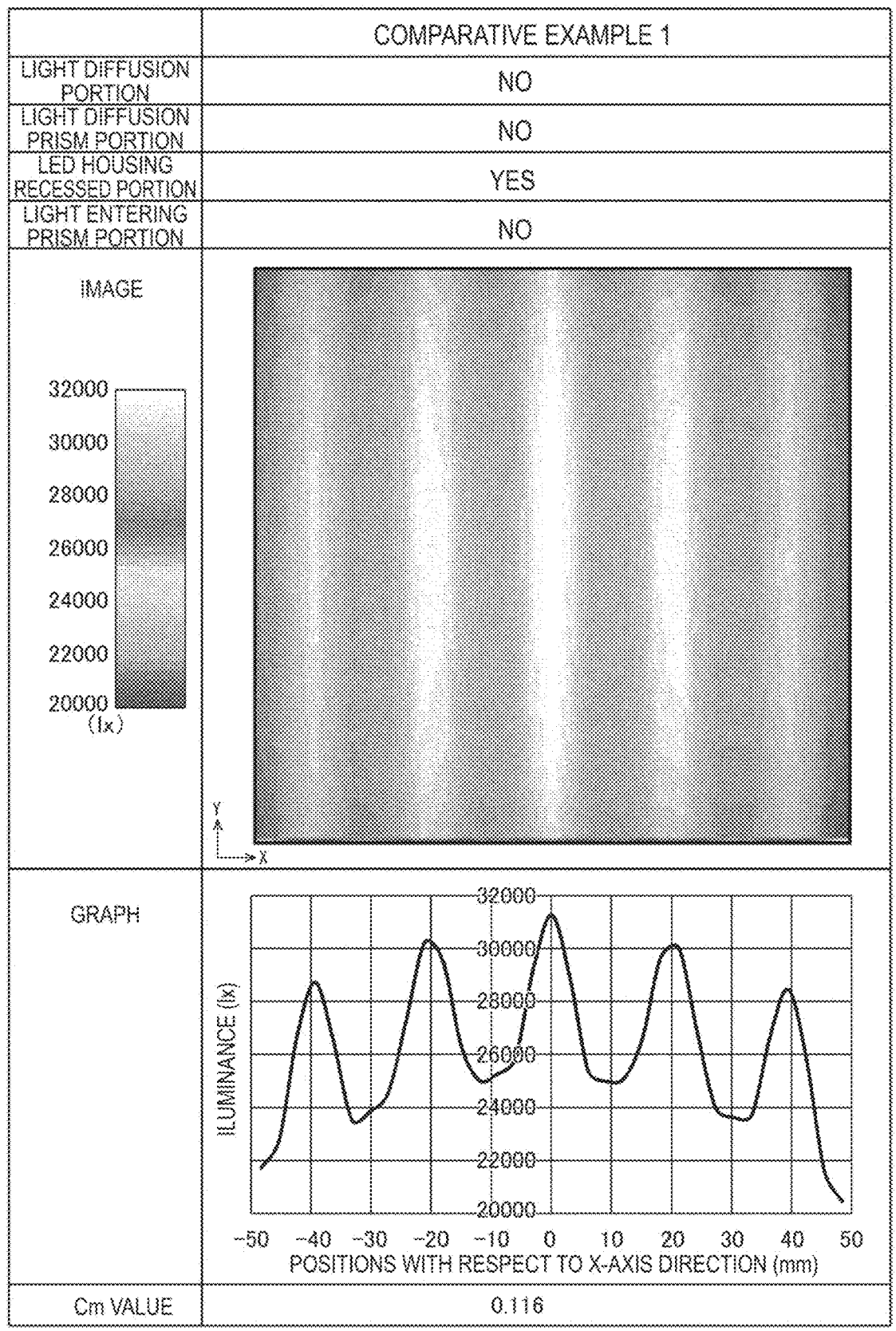
FIG. 8 is a Table illustrating experiment results of Comparative Example 1 according to Comparative Experiment 1.

The experiment results are illustrated in FIGS. 8 to 10. FIG. 8 is a table illustrating the experiment results of Comparative Example 1, FIG. 9 is a table illustrating the experiment results of Comparative Example 2, and FIG. 10 is a table illustrating the experiment results of Example 1. Each of FIGS. 8 to 10 illustrates presence or absence of the light diffusion portion 25, the light diffusion prism portion 26, the LED housing recessed portion 22, and the light entering prism portion 27, the image showing the illuminance distribution of the exit light rays, the graph illustrating the illuminance distribution with respect to the X-axis direction, and the Cm value. The unit of illuminance represented by the vertical axis in a sample of the image and the graph in each of FIGS. 8 to 10 is "lx". The horizontal axis of the graph in each of FIGS. 8 to 10 represents positions with reference to a middle position in the X-axis direction as a reference position (0) and a unit thereof is "mm". The positive and negative symbols are described on the horizontal axis of the graph in each of FIGS. 8 to 10. The symbol of "−(minus)" represents positions on the left side from the middle position, which is the reference position, with respect to the X-axis direction in FIG. 7 and the symbol of "+(plus)" represents positions on the right side. The Cm value is obtained by dividing the value, which is obtained by subtracting smallest luminance from greatest luminance of exit light, by the value obtained by adding the greatest luminance and the smallest luminance. As the Cm value is greater, the difference between the greatest luminance and the smallest luminance is greater and the sum of the greatest luminance and the smallest luminance is smaller and luminance unevenness is likely to be seen. On the other hand, as the Cm value is smaller, the difference between the greatest luminance and the smallest luminance is smaller and the sum of the greatest luminance and the smallest luminance is greater and luminance unevenness is less likely to be seen.

The experiment results of Comparative Experiment 1 will be described. With reference to the image and the graph in FIG. 8, the illuminance distribution of Comparative Example 1 includes locally bright portions extending in the Y-axis direction in a linear form (a band-like form) and five bright portions are arranged at intervals in the X-axis direction. The bright portions are present directly above the five LED rows of Comparative Example 1 (refer the positions of −40 mm, −20 mm, 0 mm, 20 mm, 40 mm on the horizontal axis). It is presumed that the light emitted by the LEDs is hardly diffused in the X-axis direction while travelling within the light guide plate and exits the light guide plate in Comparative Example 1 that does not include the light diffusion portion, the light diffusion prism portion, and the light entering prism portion. The Cm value in FIG. 8 is large and luminance unevenness is much more likely to be seen in Comparative Example 1. Next, with reference to the image and the graph in FIG. 9, the illuminance distribution of Comparative Example 2 includes five bright portions each of which is formed in a linear form (a band-like form) similar to the Comparative Example 1 but the difference in the illuminance between adjacent bright portions is slightly smaller. Since Comparative Example 2 does not include the light diffusion portion and the light diffusion prism portion but includes the light entering prism portion, it is presumed that the light that has entered through the light entering top surface is diffused in the X-axis direction by the light entering prism portion and illuminance of the bright portions is lower than Comparative Example 1. The Cm value in FIG. 9 is smaller than that of Comparative Example 1 and luminance unevenness is slightly suppressed in Comparative Example 2.

With reference to the image and the graph in FIG. 10, the illuminance distribution of Example 1 does not include bright portions corresponding to the respective five LED rows and illuminance is highest in a central section with respect to the X-axis direction and the Y-axis direction and is lowered gently as the position is farther away from the central section. Since Example 1 includes the light diffusion portion 25, the light diffusion prism portion 26, and the light entering prism portion 27, it is presumed that the light that has entered through the light entering top surface 15A1 is diffused in the X-axis direction by the light entering prism portion 27 and some of the light rays that have reached the portion of the light exit surface 15B directly above the LED row are diffused in the X-axis direction by the light diffusion portion 25 and the light diffusion prism portion 26 and the exit light is less likely to be concentrated on the portion directly above the LED row. Moreover, it is presumed that the light exiting acceleration effect by the first light exit prism portion 28 and the opposite sloped surfaces 23, the light diffusing effect with respect to the Y-axis direction by the second light exit lens portion 29, and the light rays mixing effect by the first light exit prism portion 28 and the second light exit lens portion 29 contribute to the results of Example 1. The Cm value in FIG. 10 is lowered to about one tenth of that in Comparative Example 2 and luminance unevenness is hardly seen in Example 1.

Figure 11:
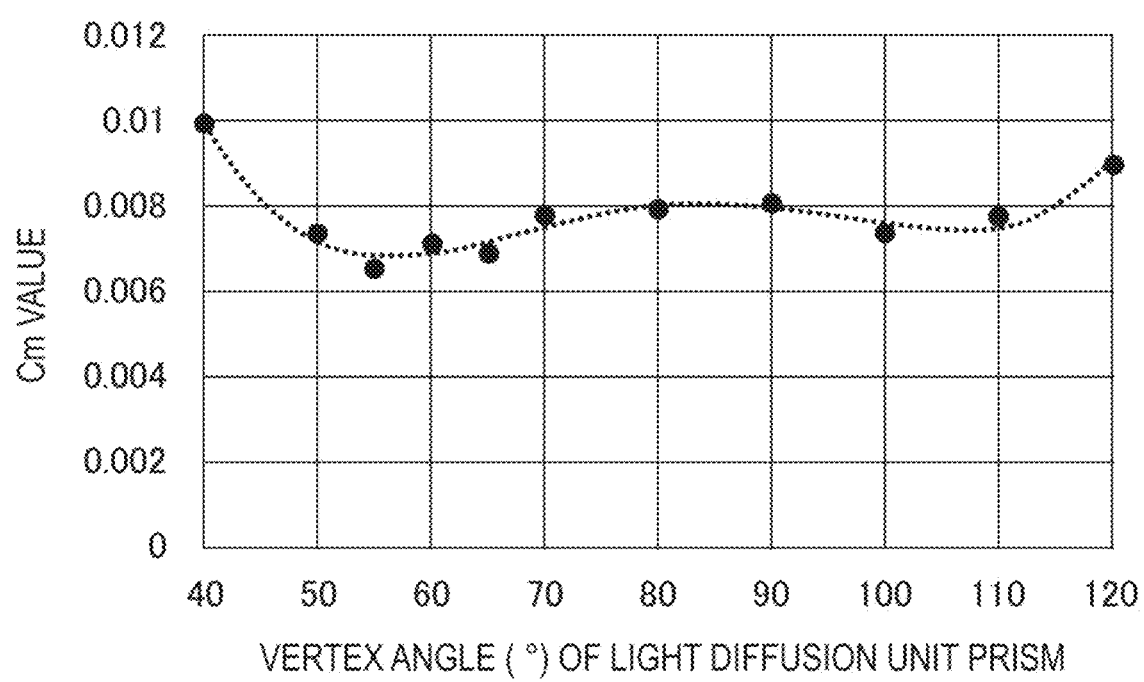
FIG. 11 is a graph illustrating relations of an apex angle and a Cm value of a light diffusion unit prism according to Comparative Experiment 2.

Comparative Experiment 2 will be described. Comparative Experiment 2 was performed to know how the Cm value changes when the vertex angle θ1 of the light diffusion unit prism 26A of the light diffusion prism portion 26 included in the light guide plate 15 of Example 1 described in Comparative Experiment 1 is varied. In Comparative Experiment 2, the respective Cm values were measured when the vertex angle θ1 of the light diffusion unit prism 26A is 40°, 50°, 55°, 60°, 65°, 70°, 80°, 90°, 100°, 110°, 120°. The experiment results are illustrated in FIG. 11. FIG. 11 illustrates a graph in which the vertical axis represents the Cm values and the horizontal axis represents the vertex angles θ1 of the light diffusion unit prism 26A (the unit is "°").

The experiment results of Comparative Experiment 2 will be described. With reference to FIG. 11, the fluctuation of the Cm values is totally small even if the vertex angle θ1 of the light diffusion unit prism 26A is varied from 40° to 120°. However, the Cm value is greater than 0.008 when the vertex angle θ1 is 40° and 120° and this means that luminance unevenness is likely to be seen. On the other hand, the Cm value is 0.008 or smaller when the vertex angle θ1 is within a range from 45° to 115°, inclusive, and this means that luminance unevenness is less likely to be seen. Particularly, when the vertex angle θ1 is within a range from 55° to 65°, inclusive, the Cm value stably remains 0.007 or smaller and this means that luminance unevenness is stably less likely to be seen within the range.

Figure 12:
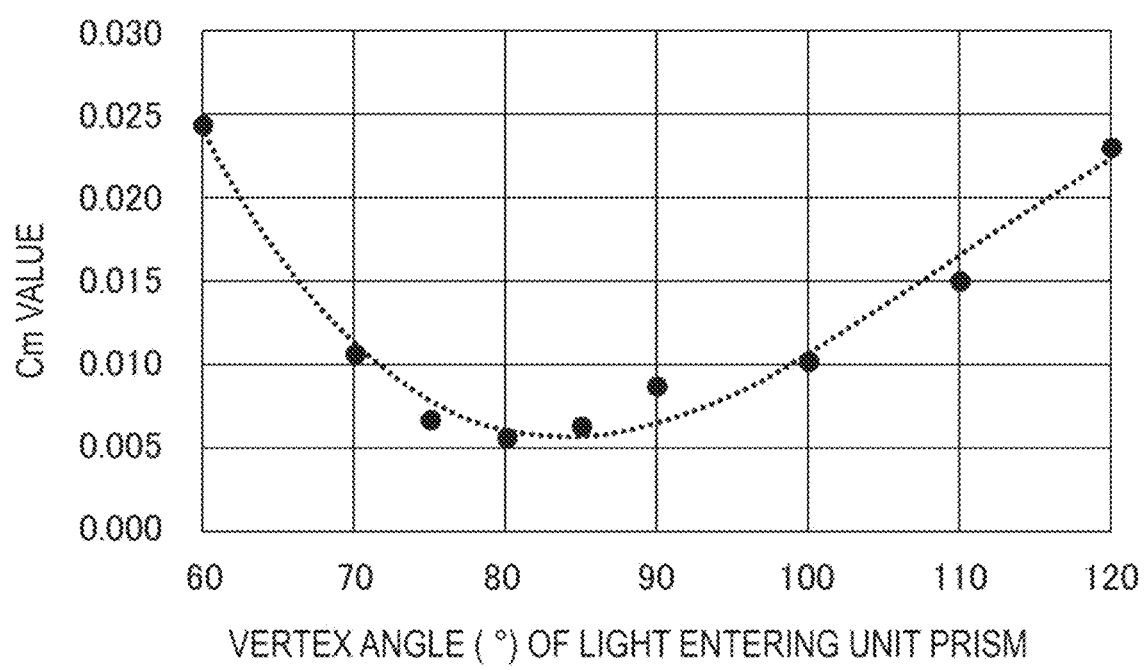
FIG. 12 is a graph illustrating relations of an apex angle and a Cm value of a light entering unit prism according to Comparative Experiment 3.

Comparative Experiment 3 will be described. Comparative Experiment 3 was performed to know how the Cm value changes when the vertex angle θ2 of the light entering unit prism 27A of the light entering prism portion 27 included in the light guide plate 15 of Example 1 described in Comparative Experiment 1 is varied. In Comparative Experiment 3, the respective Cm values were measured when the vertex angle θ2 of the light entering unit prism 27A is 60°, 70°, 75°, 80°, 85°, 90°, 100°, 110°, 120°. The experiment results are illustrated in FIG. 12. FIG. 12 illustrates a graph in which the vertical axis represents the Cm values and the horizontal axis represents the vertex angles θ2 of the light entering unit prism 27A (the unit is "°").

The experiment results of Comparative Experiment 3 will be described. With reference to FIG. 12, the fluctuation of the Cm values is greater than the experiment results of Comparative Experiment 2 (see FIG. 11) when the vertex angle θ2 of the light entering unit prism 27A is varied from 60° to 120°. This means that the conditions for setting the vertex angle θ2 of the light entering unit prism 27A is more severe than those for the light diffusion prism portion 26 and specifying an effective range is important for suppressing luminance unevenness. Specifically, with reference to FIG. 12, when the vertex angle θ2 is 70° or smaller and 100° or greater, the Cm value is greater than 0.01 and luminance unevenness is likely to be seen. On the other hand, when the vertex angle θ2 is within a range from 75° to 90°, inclusive, the Cm value is smaller than 0.01 and luminance unevenness is less likely to be seen. Particularly, when the vertex angle θ2 is within a range from 75° to 85°, inclusive, the Cm value remains 0.008 or smaller and this means that luminance unevenness is less likely to be seen.

Figure 13:
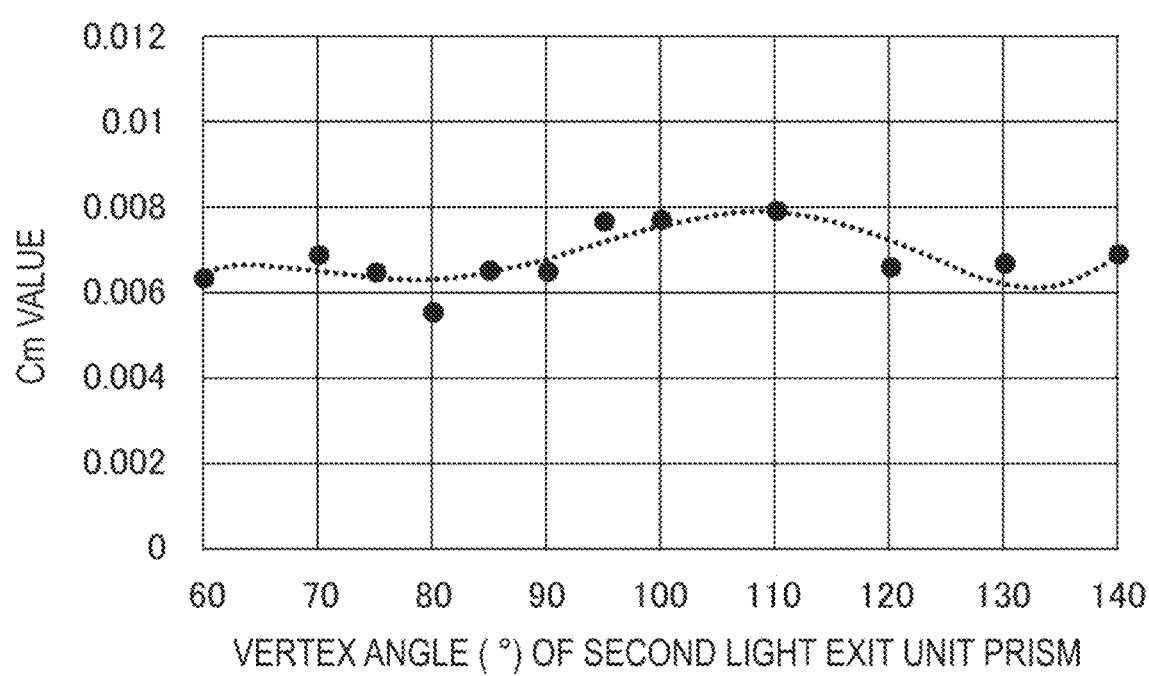
FIG. 13 is a graph illustrating relations of an apex angle and a Cm value of a second light exit unit prism according to Comparative Experiment 4.

Comparative Experiment 4 will be described. Comparative Experiment 4 was performed to know how the Cm value changes when the vertex angle θ4 of the second light exit unit prism 29A of the second light exit lens portion 29 included in the light guide plate 15 of Example 1 described in Comparative Experiment 1 is varied. In Comparative Experiment 4, the respective Cm values were measured when the vertex angle θ4 of the second light exit unit prism 29A is 60°, 70°, 75°, 80°, 85°, 90°, 95°, 100°, 110°, 120°, 130°, 140°. The experiment results are illustrated in FIG. 13. FIG. 13 illustrates a graph in which the vertical axis represents the Cm values and the horizontal axis represents the vertex angles 84 of the second light exit unit prism 29A (the unit is "°").

Figure 14:
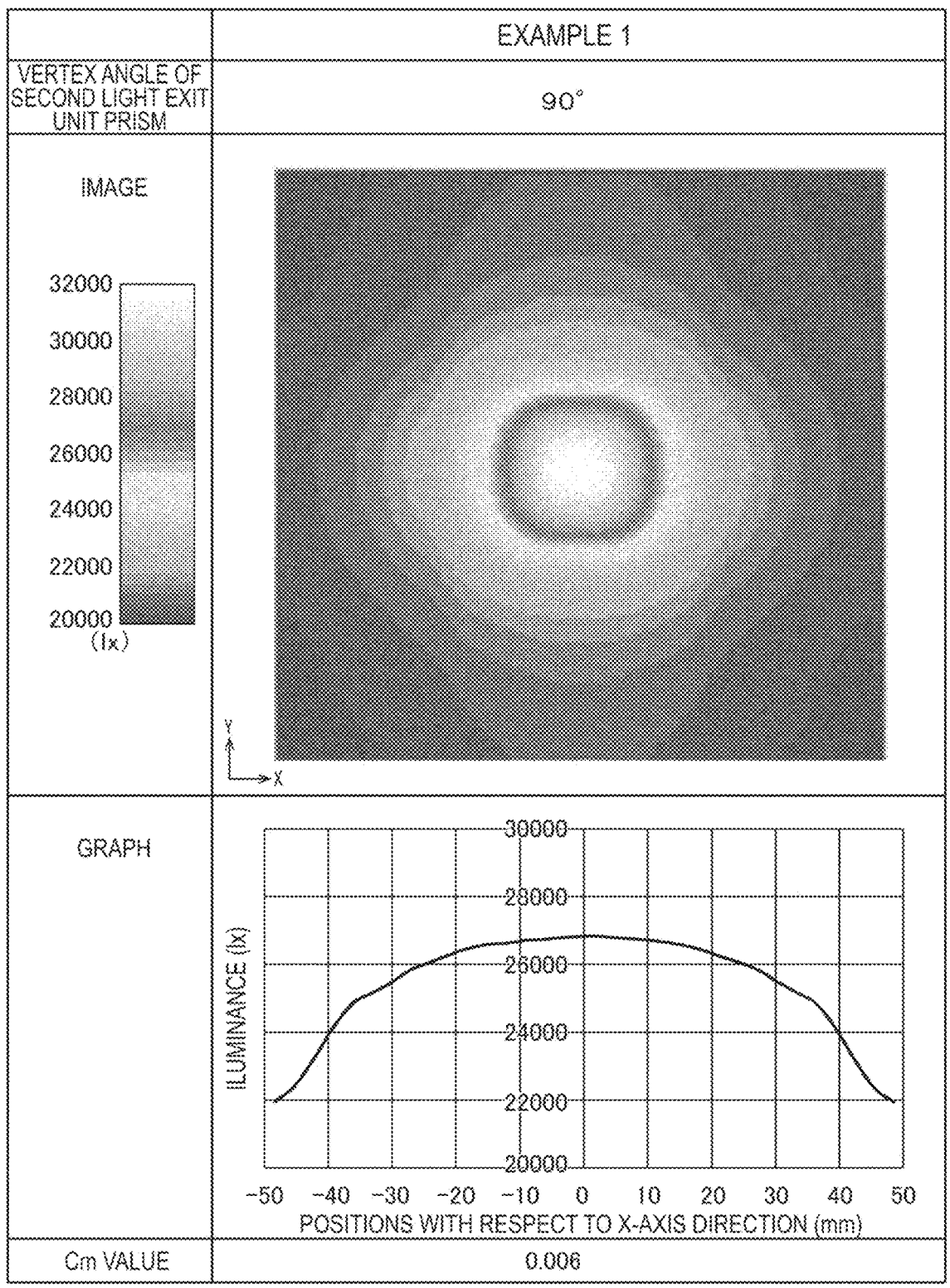
FIG. 14 is a Table illustrating experiment results of Example 1 according to Experimental Demonstration 1.

The experiment results of Comparative Experiment 4 will be described. With reference to FIG. 13, the fluctuation of the Cm values is totally small and is smaller than the experiment results of Comparative Experiment 2 (refer FIG. 11) even if the vertex angle θ4 of the second light exit unit prism 29A is varied from 60° to 140°. Specifically, this means that the Cm value is never greater than 0.008 while the vertex angle θ4 is varied from 60° to 140° and luminance unevenness is less likely to be seen in any of the vertex angles 64. As long as the vertex angle θ4 is in a range from 75° to 90°, inclusive, the Cm value stably remains 0.007 or smaller and luminance unevenness is stably less likely to be seen within the range. Experimental Demonstration 1 will be described. In Experimental Demonstration 1, the illuminance distribution of exit light and Cm values were measured when some of the LEDs 13 included in each of the LED rows of Example 1 described in Comparative Experiment 1 were lighted. Specifically, in Experimental Demonstration 1, the LEDs 13 included in each of the LED rows in Example 1 are divided into groups (five groups, for example). The LEDs 13 (twenty LEDs 13, for example) included in a middle group in the Y-axis direction of a LED row that is on a middle in the X-axis direction are selectively lighted and the LEDs 13 included in other groups of the middle LED row and the LEDs 13 included in other LED rows are not lighted. In such a state, an image that represents an illuminance distribution of the exit light rays was taken and illuminance of the exit light rays was measured and a graph relating the illuminance distribution was obtained and Cm values were measured. Since each of the LED rows is divided into the groups and light is selectively emitted by the LEDs 13 included in the respective groups, the local-dimming control and the HDR control can be performed. The experiment results are illustrated in FIG. 14. FIG. 14 illustrates the vertex angle θ4 of the second light exit unit prism 29A, the image showing the illuminance distribution of the exit light rays, the graph illustrating the illuminance distribution with respect to the X-axis direction, and the Cm value. The unit of illuminance represented by the vertical axis in a sample of the image and the graph in FIG. 14 is "lx". The horizontal axis of the graph in FIG. 14 represents positions with reference to a middle position in the X-axis direction as a reference position (0) and the unit thereof is "mm". The positive and negative symbols that are described on the horizontal axis of the graph in FIG. 14 represent the same as described in Comparative Experiment 1.

The experiment results of Experimental Demonstration 1 will be described. With reference to the image and the graph in FIG. 14, the illuminance distribution of Example 1 locally includes a bright portion in a middle section with respect to the X-axis direction and the Y-axis direction. The bright portion is substantially directly above the LEDs 13 that are included in the selected group of Example 1 and selectively lighted. The LEDs 13 that are included in the selected group and selectively lighted are arranged linearly along the Y-axis direction; however, the measured bright portion corresponds to the illuminance distribution that has almost a perfect circular shape. Since the backlight device of Example 1 includes the light diffusion portion 25, the light diffusion prism portion 26, and the light entering prism portion 27, light rays that have entered through the light entering top surface 15A1 are diffused in the X-axis direction by the light entering prism portion 27 and the light rays that have reached the portion of the light exit surface 15B directly above the LED row are diffused in the X-axis direction by the light diffusion portion 25 and the light diffusion prism portion 26. It is presumed that this avoids the exit light rays from being concentrated on the portions directly above the LEDs 13 that are included in the selected group and selectively lighted. The vertex angle θ4 of the second light exit unit prism 29A is 90° and such a configuration avoids the light from being diffused excessively in the Y-axis direction. Accordingly, Example 1 is preferable for performing the local dimming control and the HDR control. The Cm value is maintained sufficiently low.

Figure 15:
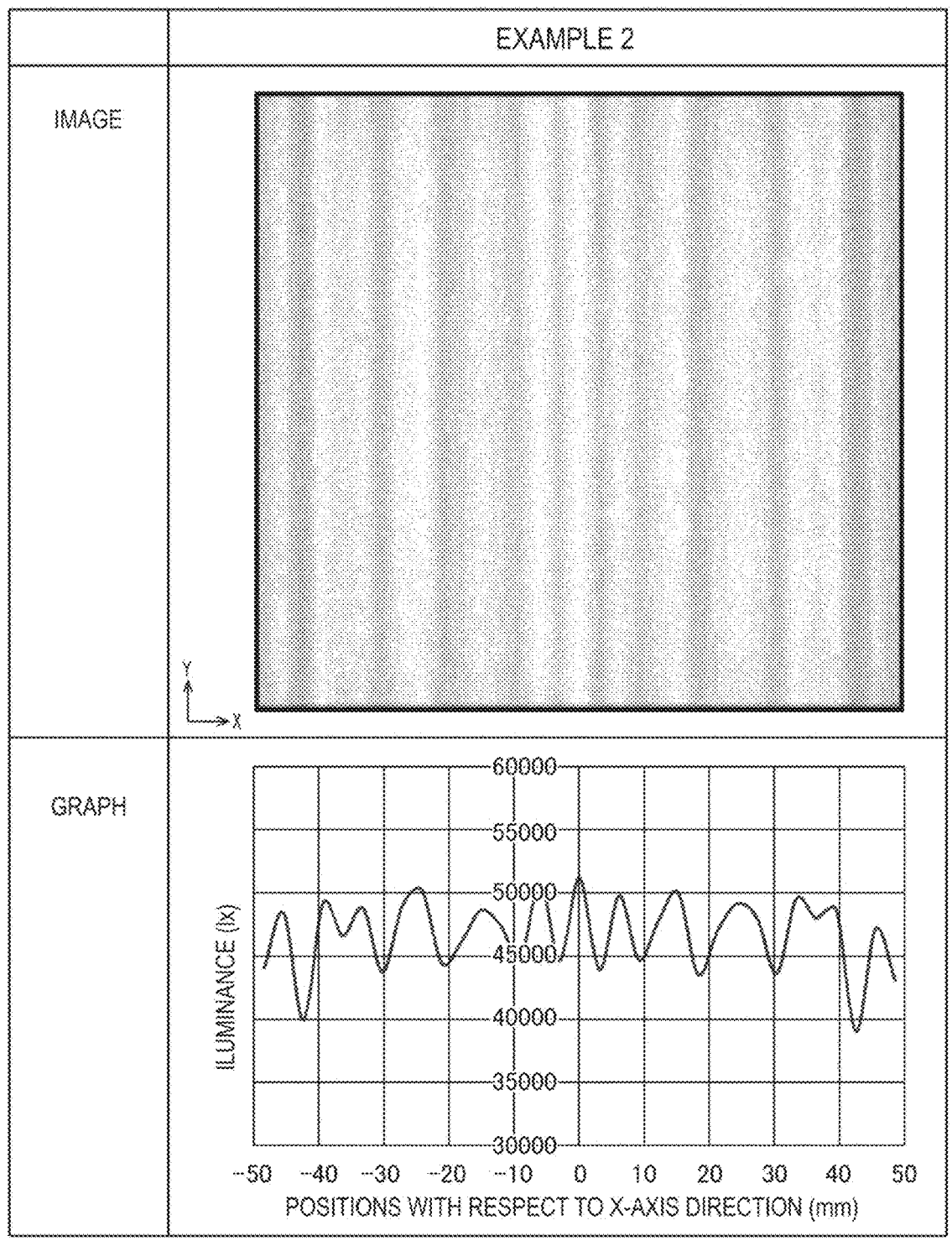
FIG. 15 is a Table illustrating experiment results of Example 2 according to Experimental Demonstration 2.

Experimental Demonstration 2 will be described. In Experimental Demonstration 2, a backlight device having the configuration of Example 1 in Comparative Experiment 1 without including the optical sheets 17 is prepared as Example 2 and the illuminance distribution relating the exit light exiting the light guide plate 15 of Example 2 was measured. Specifically, an image that represents an illuminance distribution of the exit light rays was taken while all of the LEDs 13 being lighted and illuminance of the exit light was measured and a graph relating the illuminance distribution was obtained. The experiment results are illustrated in FIG. 15. FIG. 15 illustrates the image showing the illuminance distribution of the exit light rays and the graph illustrating the illuminance distribution with respect to the X-axis direction. Although a sample is not attached to the image in FIG. 15, the density of the image tends to be lower as the illuminance is increased and the density of the image tends to be increased as the illuminance is lowered. The unit of illuminance represented by the vertical axis in the graph in FIG. 15 is "lx". The horizontal axis of the graph in FIG. 15 represents positions with reference to a middle position in the X-axis direction as a reference position (0) and the unit thereof is "mm". The positive and negative symbols that are described on the horizontal axis of the graph in FIG. 15 represent the same as described in Comparative Experiment 1.

The experiment results of Experimental Demonstration 2 will be described. With reference to the graph of FIG. 15, since the optical sheets 17 are not included, the illuminance distribution has small unevenness. However, difference in the illuminance between the bright portions and the dark portions is small. Specifically, comparing portions of the light exit surface 15B overlapping the LEDs 13 included in the LED row (positions of −40 mm, −20 mm, 0 mm, 20 mm, 40 mm on the horizontal axis) and portions not overlapping the LEDs 13, it is obvious that a bright portion that has extremely high illuminance is not present. This may be caused by the diffusion effect that the light is effectively diffused in the X-axis direction by the light diffusion prism portion 26 and the light entering prism portion 27 and the light exit acceleration effect by the opposite sloped surfaces 23. The light rays that have travelled within the light guide plate 15 toward an opposite side from the light exit surface 15B in the Z-axis direction are directed upward toward the first light exit prism portions 28 by the opposite sloped surfaces 23. Accordingly, the light can exit evenly through the light exit surface 15B within a surface area of the light exit surface 15B with respect to the X-axis direction (refer FIG. 2).

As described before, the backlight device 12 (the lighting device) in this embodiment includes the LEDs 13 (light sources) that are arranged in rows, the light guide plate 15 that is disposed to cover the LEDs 13, and the light diffusion portion 25. The light guide plate 15 includes a portion of a plate surface opposite the LEDs 13 as the light entering surface 15A through which light emitted by the LEDs 13 enters and a plate surface that is an opposite side from the light entering surface 15A as the light exit surface 15B. The light diffusion portion 25 extends on the light exit surface 15B along the arrangement direction in which the LEDs 13 are arranged and a portion of the light diffusion portion 25 overlaps the LEDs 13. The light diffusion portion 25 adds the diffusion action such that the light rays travelling within the light guide plate 15 travel in a direction crossing the arrangement direction and to be away from the LEDs 13 seen from the normal direction of the light exit surface 15B.

According to such a configuration, the light emitted by the LEDs 13 that are arranged in rows enters through the light entering surface 15A of the light guide plate 15 that is disposed to cover the LEDs 13 and travels within the light guide plate 15 and exits through the light exit surface 15B. With the above configuration in which the LEDs 13 are arranged in rows, difference in the amount of exit light is easily caused between the portions of the light exit surface 15B of the light guide plate 15 overlapping the LEDs 13 and the portions not overlapping the LEDs 13 and this may cause luminance unevenness. The entire thickness needs to be increased to avoid such luminance unevenness. The light diffusion portion 25 on the light exit surface 15B extends in the arrangement direction of the LEDs 13 and a portion of the light diffusion portion 25 overlaps the LEDs 13. Diffusion action is added to the light rays that are present within the light guide plate 15 so as to travel in the direction crossing the arrangement direction and to be away from the LEDs 13 seen from the normal direction of the light exit surface 15B. According to such a configuration, the exiting of light is suppressed in the portions of the light exit surface 15B overlapping the LEDs 13 where the exiting of light is likely to be excessive and the exiting of light is accelerated in the portions of the light exit surface 15B not overlapping the LEDs 13 where the exiting of light is likely to be low. This is preferable for suppressing luminance unevenness and reducing the thickness while achieving reduction in number of the LEDs 13. Moreover, when light is emitted selectively by the certain LEDs 13 of the LEDs 13, the diffusion action is added to the light by the light diffusion portion 25 and this accelerates the exiting of light through the portions of the light exit surface 15B around the LEDs 13 that emit light and the light is less likely to exit through the portions near the LEDs 13 that do not emit light. This is preferable for performing so-called local dimming control and the high dynamic range (HDR) control.

The light diffusion portion 25 is formed by depressing the light exit surface 15B and includes the light exit sloped surfaces 25A on a surface thereof. The light exit sloped surfaces 25A are sloped obtusely with respect to the light exit surface 15B. According to such a configuration, the light rays that are present within the light guide plate 15 are totally reflected by the light exit sloped surfaces 25A of the inner surface of the light diffusion portion 25. Then, the light rays are diffused such that the light rays travel in a direction so as to be away from the LEDs 13 seen from the normal direction of the light exit surface 15B and travel in a direction opposite from the light exit surface 15B with respect to the thickness direction of the light guide plate 15. Accordingly, high light use efficiency can be maintained and occurrence of luminance unevenness is effectively suppressed. Furthermore, since the light diffusion portion 25 has a recessed form in the light exit surface 15B, a greater amount of light rays to which the diffusion action is added can travel in the direction crossing the arrangement direction so as to be away from the LEDs 13 and luminance unevenness is more effectively suppressed compared to a configuration in which the light diffusion portion is formed as protrusion on the light exit surface 15B.

The light diffusion portion 25 includes the bottom surface 25B on the inner surface thereof that is continuous to the bottom-side end portions of the light exit sloped surfaces 25A and includes the light diffusion prism portion 26. The light diffusion prism portion 26 includes the light diffusion unit prisms 26A that extend on the bottom surface 25B of the light diffusion portion 25 along the arrangement direction and are arranged in the direction crossing the arrangement direction seen from the normal direction of the light exit surface 15B. According to such a configuration, the light rays that are present within the light guide plate 15 are totally reflected by the sloped surfaces 26A1 of the light diffusion unit prisms 26A on the bottom surface 25B included in the inner surface of the light diffusion portion 25. Then, the light rays are diffused such that the light rays travel in the direction crossing the arrangement direction and to be away from the LEDs 13 seen from the normal direction of the light exit surface 15B and travel in a direction opposite from the light exit surface 15B with respect to the thickness direction of the light guide plate 15. Accordingly, luminance unevenness is effectively suppressed.

The light diffusion prism portion 26 is configured such that the vertex angle θ1 of the light diffusion unit prism 26A is within a range from 45° to 115°, inclusive. According to such a configuration, a greater amount of light rays that have totally reflected by the sloped surfaces 26A1 of the light diffusion unit prisms 26A can be diffused to travel in the direction crossing the arrangement direction and to be away from the LEDs 13 seen from the normal direction of the light exit surface 15B compared to a configuration in which the vertex angle of the light diffusion unit prism is smaller than 45° or the vertex angle is greater than 115°. This can sufficiently lower the Michelson Contrast (Cm) values relating the exit light rays and occurrence of luminance unevenness is effectively suppressed.

The light guide plate 15 includes the LED housing recessed portions 22 (the light source housing recessed portion) on the plate surface thereof opposite the LEDs 13. The LED housing recessed portions 22 extend in the arrangement direction and the light entering surface 15A includes a portion of the inner surface of the LED housing recessed portion 22. According to such a configuration, the LEDs 13 are collectively arranged in the LED housing recessed portion 22 that extends in the arrangement direction and the light emitted by the LEDs 13 enters through the light entering surface 15A that is a portion of the inner surface of the LED housing recessed portion 22. Since the LEDs 13 are arranged in the LED housing recessed portion 22, the whole device can be reduced in thickness.

A portion of the inner surface of the LED housing recessed portion 22 is in contact with a portion of the LEDs 13 such that the light guide plate 15 can be positioned with respect to the LEDs 13 in the crossing direction that crosses the arrangement direction seen from the normal direction of the light exit surface 15B. In such a contact state, the light diffusion portion 25 is disposed such that a center thereof is on the same position as the center of the LEDs 13 that are in contact with the portion of the inner surface of the LED housing recessed portion 22 with respect to the crossing direction. According to such a configuration, in the mounting of the light guide plate 15 and the LEDs 13, the portion of the inner surface of the LED housing recessed portion 22 for receiving the LEDs 13 is contacted with at least a portion of the LEDs 13 and the light guide plate 15 is positioned with respect to the LEDs 13 in the crossing direction that crosses the arrangement direction seen from the normal direction of the light exit surface 15B. In such a state, since the light diffusion portion 25 is disposed such that the center thereof is on the same position as the center of the LEDs 13 with respect to the crossing direction, the light emitted by the LEDs 13 can be evenly diffused in both sides by the light diffusion portion 25 to travel in a direction so as to be away from the LEDs 13 along the crossing direction seen from the normal direction of the light exit surface 15B. This preferably suppress occurrence of luminance unevenness.

Each of the LEDs 13 has the light emission side surfaces 13B that extend along the plate thickness direction of the light guide plate 15 and through which light is emitted. The inner surface of the LED housing recessed portion 22 includes the light entering sloped surfaces 15A2 that are opposite the light emission side surfaces 13B of each LED 13 and configure portions of the light entering surface 15A. The light entering sloped surfaces 15A2 are sloped with respect to the plate thickness direction such that the LED housing recessed portion 22 becomes narrower as the surfaces extend closer to the light exit surface 15B in the plate thickness direction. According to such a configuration, the light emitted by the LEDs 13 through the light emission side surfaces 13B enters through the light entering sloped surfaces 15A2 that are portions of the inner surface of the LED housing recessed portion 22. Since the light entering sloped surfaces 15A2 are sloped with respect to the plate thickness direction such that the LED housing recessed portion 22 becomes narrower as the surfaces extend closer to the light exit surface 15B in the plate thickness direction of the light guide plate 15, the light that has entered the light guide plate 15 travels toward the light exit surface 15B. Furthermore, with the light entering sloped surfaces 15A2 that are sloped as described before, a molding die for forming the LED housing recessed portions 22 can be easily detached from an object when producing the light guide plate 15 with injection molding.

Each of the LEDS 13 includes the light emitting top surface 13A that is closer to the light exit surface 15B than the light emission side surfaces 13B in the plate thickness direction and is a surface crossing the light emission side surfaces 13B. The LED housing recessed portion 22 includes the light entering top surface 15A1 on the inner surface thereof and the light entering top surface 15A1 faces the light emitting top surface 13A and is a portion of the light entering surface 15A. The LED housing recessed portion 22 includes the light entering prism portion 27 on the light entering top surface 15A1. The light entering prism portion 27 includes the light entering unit prisms 27A that extend along the arrangement direction and are arranged in the direction crossing the arrangement direction seen from the normal direction of the light exit surface 15B. According to such a configuration, the light emitted by the LEDs 13 through the light emitting top surfaces 13A enters through the light entering top surface 15A1 included in the inner surface of the LED housing recessed portion 22. Since the LED housing recessed portion 22 includes the light entering unit prisms 27A of the light entering prism portion 27 on the light entering top surface 15A1, the light that has entered through the light entering top surface 15A1 can be spread by the light entering unit prisms 27A in the direction crossing the arrangement direction seen from the normal direction of the light exit surface 15B. Accordingly, the greater amount of light rays can travel in the direction crossing the arrangement direction and to be away from the LEDs 13 seen from the normal direction of the light exit surface 15B and this preferably suppresses occurrence of luminance unevenness.

The light entering prism portion 27 is configured such that the vertex angle θ2 of the light entering unit prism 27A is from 75° to 85°, inclusive. According to such a configuration, a greater amount of light rays that have totally reflected by the sloped surfaces 27A1 of the light entering unit prisms 27A can be diffused to travel in the direction crossing the arrangement direction and to be away from the LEDs 13 seen from the normal direction of the light exit surface 15B compared to the configuration in which the vertex angle of the light entering unit prism is smaller than 75° or the vertex angle is greater than 85°. According to such a configuration, the Michelson Contrast (Cm) value can be effectively lowered and occurrence of luminance unevenness can be effectively suppressed.

The light guide plate 15 includes the first light exit prism portion 28 on the light exit surface 15B so as not to overlap the light diffusion portion 25. The first light exit prism portion 28 includes the first light exit unit prisms 28A that extend along the arrangement direction and are arranged in the direction crossing the arrangement direction seen from the normal direction of the light exit surface 15B. According to such a configuration, among the light rays travelling within the light guide plate 15, light rays that have reached the first light exit unit prisms 28A of the first light exit prism portion 28 exit through the sloped surfaces 28A1 of the first light exit unit prisms 28A or are totally reflected by the sloped surfaces 28A1 of the first light exit unit prisms 28A to travel away from the LEDs 13 and the light exit surface 15B. The light rays that have totally reflected by the sloped surfaces 28A1 of the first light exit unit prisms 28A will be retro-reflection light rays that travel toward the light exit surface 15B again and exit through the sloped surfaces 28A1 of the first light exit unit prisms 28A. Since the first light exit prism portion 28 does not overlap the light diffusion portion 25 a portion of which overlaps the LEDs 13, the first light exit prism portion 28 does not accelerate the light to exit through the portions of the light exit surface 15B overlapping the LEDs 13 and accelerates the light to exit through the portions of the light exit surface 15B not overlapping the LEDs 13. Accordingly, occurrence of luminance unevenness is effectively suppressed.

In the first light exit prism portion 28, the interval between the first light exit unit prisms 28A is larger than the width dimension of the first light exit unit prism 28A and the first light exit unit prisms 28A are formed in a recessed form in the light exit surface 15B. According to such a configuration, the light rays that have totally reflected by the sloped surfaces 28A1 of the first light exit unit prism 28A can travel much farther away from the LEDs 13 seen from the normal direction of the light exit surface 15B compared to a configuration in which the first light exit unit prism is formed on the light exit surface 15B as a protrusion. Accordingly, the light is much likely to exit through the portions of the light exit surface 15B not overlapping the LEDs 13 and luminance unevenness is suppressed more effectively.

The light guide plate 15 includes the second light exit lens portion 29 on the light exit surface 15B so as not to overlap the light diffusion portion 25. The second light exit lens portion 29 includes the second light exit unit prisms 29A that extend along the direction crossing the arrangement direction seen from the normal direction of the light exit surface 15B and are arranged in the arrangement direction. According to such a configuration, most of the light rays that have travelled within the light guide plate 15 and reached the second light exit unit prisms 29A of the second light exit lens portion 29 are totally reflected by the sloped surfaces 29A1 (peripheral surface) of the second light exit unit prisms 29A to travel in the arrangement direction so as to be away from the light exit surface 15B. The light rays that have been totally reflected by the sloped surfaces 29A1 of the second light exit unit prisms 29A will be retro-reflection light rays that travel toward the light exit surface 15B again and exit through the sloped surfaces 28A1 of the first light exit unit prisms 28A. Thus, the light rays travelling within the light guide plate 15 can be mixed with respect to the arrangement direction and occurrence of luminance unevenness can be effectively suppressed.

The first light exit prism portion 28 includes the first light exit unit prisms 28A that are formed in a recessed form in the light exit surface 15B, and the second light exit lens portion 29 includes the second light exit unit prisms 29A that are formed in a recessed form in the light exit surface 15B. The depth dimension of the second light exit unit prism. 29A is smaller than that of the first light exit unit prism 28A. According to such a configuration, the sloped surface 28A1 of the first light exit unit prism 28A can have a larger area compared to a configuration in which the depth dimension of the second light exit unit prisms is greater than that of the first light exit unit prisms 28A. With such a configuration, the amount of light rays that exit through the sloped surface 28A1 of the first light exit unit prism 28A can be increased and this increases the light use efficiency.

In the second light exit lens portion 29, the second light exit unit lens includes the second light exit unit prisms 29A and the vertex angle θ4 of the second light exit unit prism 29A is from 75° to 90°, inclusive. According to such a configuration, the amount of retro-reflection light rays is increased compared to the configuration including a lenticular lens as the second light exit lens portion. Therefore, high mixing effect is obtained and this is preferable for suppressing occurrence of luminance unevenness. Furthermore, the second light exit unit prisms 29A are configured such that the vertex angle θ4 is set to the above range, and the Michelson Contrast (Cm) values relating the exit light can be stably lowered and occurrence of luminance unevenness is more effectively suppressed. Particularly, if the vertex angle θ4 of the second light exit unit prisms 29A is 90°, the light rays are less likely to be excessively diffused in the arrangement direction and this is preferable for performing the local dimming control and the HDR control.

The liquid crystal display device 10 (the display device) in this embodiment includes the above-described backlight device 12 and the liquid crystal panel 11 (the display panel) that performs displaying with using light from the backlight device 12. According to the liquid crystal display device 10 having such a configuration, luminance unevenness relating the exit light of the backlight device 12 can be suppressed and the backlight device 12 is reduced in thickness. Therefore, display with good display quality can be achieved and thickness is entirely reduced.

Second Embodiment

A second embodiment will be described with reference to FIGS. 16 and 17. The second embodiment does not include the light diffusion prism portion. Configurations, operations, and effects that are similar to those of the first embodiment will not be described.

Figure 16:
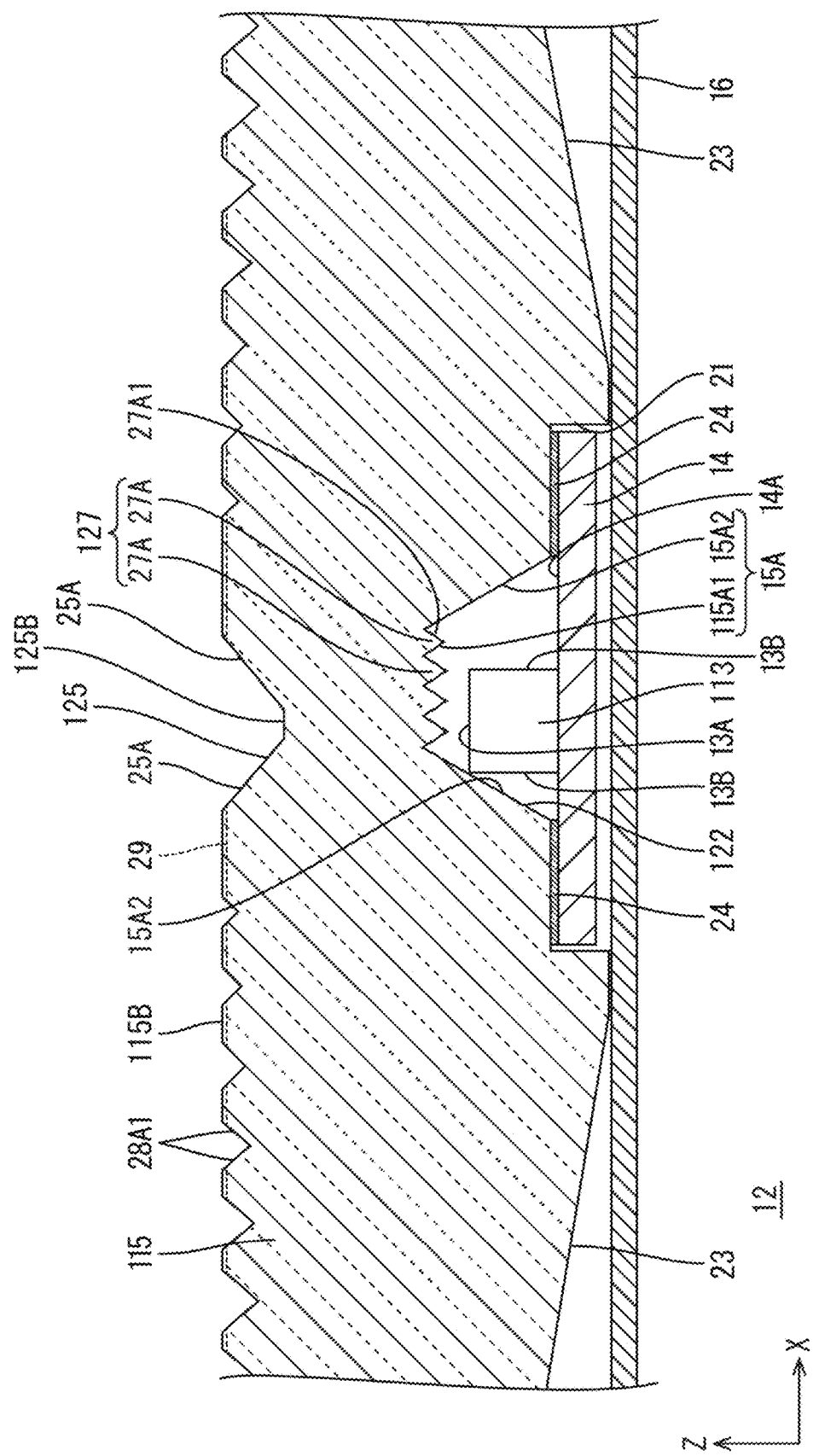
FIG. 16 is a cross-sectional view illustrating an LED, an LED board, and a light guide plate included in a backlight device according to a second embodiment and taken along the X-axis direction.

As illustrated in FIG. 16, a light guide plate 115 in this embodiment includes a light diffusion portion 125 having a bottom surface 125B as a flat surface that is parallel to the X-axis direction and the Y-axis direction and the light diffusion portion 125 does not include the light diffusion prism portions of the first embodiment.

Next, Experimental Demonstration 3 relating this embodiment was performed. In Experimental Demonstration 3, a backlight device having the configuration of Example 1 in Comparative Experiment 1 without including the light diffusion prism portion of the light guide plate is prepared as Example 3 and the illuminance distribution of exit light was measured and Cm values were measured.

Specifically, an image that represents an illuminance distribution of the exit light rays was taken while all of the LEDs included in the backlight device in Example 3 being lighted and illuminance of the exit light was measured and a graph relating the illuminance distribution was obtained and the Cm value was also measured. The experiment results are illustrated in FIG. 17. FIG. 17 illustrates presence or absence of the light diffusion portion 125, the light diffusion prism portion, a LED housing recessed portion 122, and a light entering prism portion 127, the image showing the illuminance distribution of the exit light rays, the graph illustrating the illuminance distribution with respect to the X-axis direction, and the Cm value. The unit of illuminance represented by the vertical axis in a sample of the image and the graph in FIG. 17 is "lx". The horizontal axis of the graph in FIG. 17 represents positions with reference to a middle position in the X-axis direction as a reference position (0) and a unit thereof is "mm". The positive and negative symbols that are described on the horizontal axis of the graph in FIG. 17 represent the same as described in Comparative Experiment 1.

The experiment results of Experimental Demonstration 3 will be described. With reference to the image and the graph of FIG. 17, the illuminance distribution of Example 3 hardly includes any bright portions corresponding to the five LED rows and the illuminance is highest at a center with respect to the X-axis direction and the Y-axis direction and is gently lowered as a position is farther away from the center. Since the backlight device of Example 3 includes the light diffusion portion 125 and the light entering prism portion 127, light rays that have entered through a light entering top surface 115A1 are diffused in the X-axis direction by the light entering prism portion 127 and the light rays that have reached the portion of a light exit surface 115B directly above the LED row are diffused in the X-axis direction by the light diffusion portion 125. It is presumed that this avoids the exit light rays from being concentrated on the portions directly above the LED rows. FIG. 17 is compared to FIGS. 8 to 10 that illustrate the experiment results of Comparative Experiment 1. Luminance unevenness is remarkably improved in Example 3 compared to Comparative Examples 1 and 2; however, the illuminance distribution includes wavy portions in Example 3 compared to Example 1. Specifically, in Example 3, near the portions of the light exit surface 115B overlapping the LEDs 113 included in the LED rows (the positions of −40 mm, −20 mm, 0 mm, 20 mm, 40 mm on the horizontal axis), the high illuminance range is elongated in the Y-axis direction and this causes the wavy portions in the illuminance distribution. It is presumed that it occurs because Example 3 does not include the light diffusion prism portion and the light diffusion effect in the X-axis direction is lower than that in Example 1. In Example 1, the high illuminance range has almost a perfect circular shape and the illumination distribution hardly include a wavy portion. The Cm value in Example 3 is sufficiently smaller than that in Comparative Examples 1 and 2 but is greater than that in Example 1.

Third Embodiment

A third embodiment will be described with reference to FIGS. 18 and 19. The third embodiment differs from the first embodiment in a configuration of a first light exit prism portion 228. Configurations, operations, and effects that are similar to those of the first embodiment will not be described.

Figure 18:
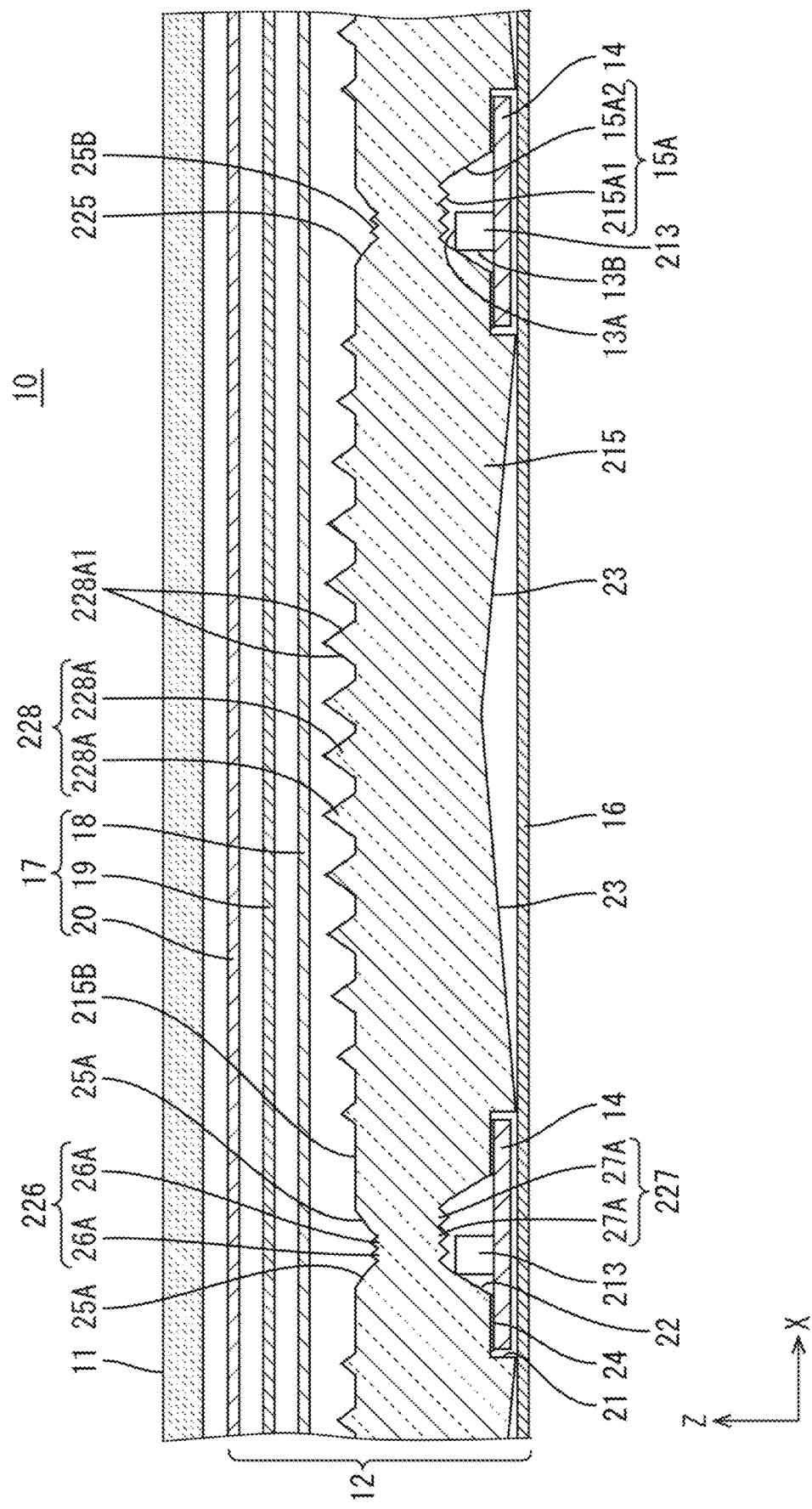
FIG. 18 is a cross-sectional view of a liquid crystal display device according to a third embodiment taken along the X-axis direction.
Figure 19:
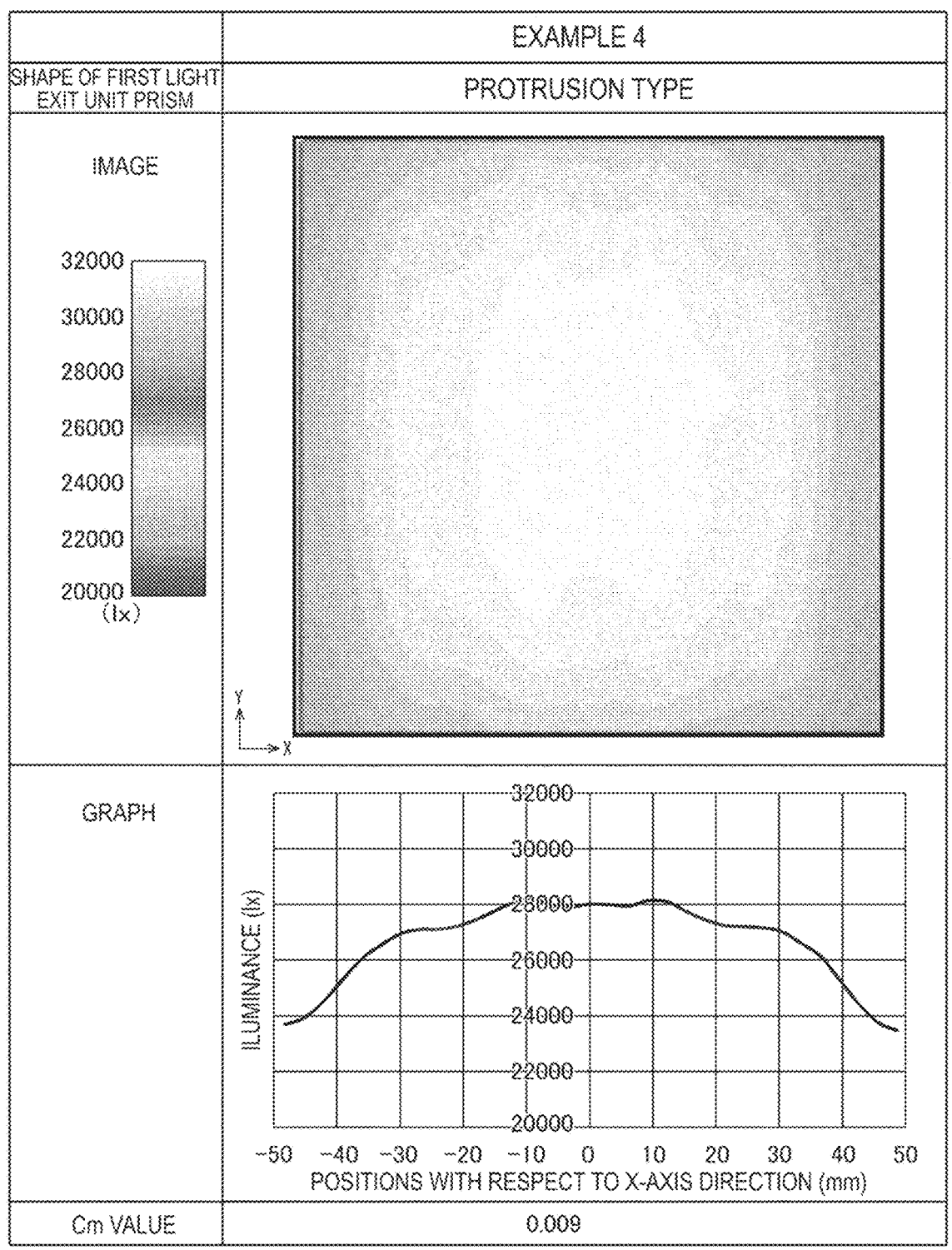
FIG. 19 is a Table illustrating experiment results of Example 4 according to Experimental Demonstration 4.

As illustrated in FIG. 18, a light guide plate 215 in this embodiment includes a first light exit prism portion 228 including first light exit unit prisms 228A. The first light exit unit prisms 228A are protruding type prisms that protrude from the light exit surface 215B.

Next, Experimental Demonstration 4 according to this embodiment was performed. In Experimental Demonstration 4, a backlight device includes the protrusion type prisms as described before instead of the first light exit unit prisms 228A of the first light exit prism portion 228 of the light guide plate in Example 1 described in Comparative Experiment 1 and the backlight device is prepared as Example 4. The illuminance distribution of exit light was measured and Cm values were measured. Specifically, in Experimental Demonstration 4, an image that represents an illuminance distribution of the exit light rays was taken while all of the LEDs included in the backlight device in Example 4 being lighted and illuminance of the exit light was measured and a graph relating the illuminance distribution was obtained and the Cm value was also measured. The experiment results are illustrated in FIG. 19. FIG. 18 illustrates a shape of the first light exit unit prisms 228A and FIG. 19 illustrates the image showing the illuminance distribution of the exit light rays, the graph illustrating the illuminance distribution with respect to the X-axis direction, and the Cm value. The unit of illuminance represented by the vertical axis in a sample of the image and the graph in FIG. 19 is "lx". The horizontal axis of the graph in FIG. 19 represents positions with reference to a middle position in the X-axis direction as a reference position (0) and a unit thereof is "mm". The positive and negative symbols that are described on the horizontal axis of the graph in FIG. 19 represent the same as described in Comparative Experiment 1.

The experiment results of Experimental Demonstration 4 will be described. From the image and the graph of FIG. 19, the illuminance distribution of Example 4 hardly includes any bright portions corresponding to the five LED rows and the illuminance is highest in a center section with respect to the X-axis direction and the Y-axis direction and is gently lowered as a position is farther away from the center section. Since the backlight device of Example 4 includes the light diffusion portion 225, the light diffusion prism portion 226, and the light entering prism portion 227, light rays that have entered through a light entering top surface 215A1 are diffused in the X-axis direction by the light entering prism portion 227 and the light rays that have reached the portions of a light exit surface 215B directly above the LED row are diffused in the X-axis direction by the light diffusion portion 225 and the light diffusion prism portion 226. It is presumed that this avoids the exit light rays from being concentrated on the portions directly above the LED rows. FIG. 19 is compared to FIGS. 8 to 10 that illustrate the experiment results of Comparative Experiment 1. Luminance unevenness is remarkably improved in Example 4 compared to Comparative Examples 1 and 2; however, the illuminance distribution includes wavy portions in Example 4 compared to Example 1. Specifically, in Example 4, near the portions of the light exit surface 215B not overlapping the LEDs 213 included in the LED rows (the positions of −30 mm, −10 mm, 10 mm, 30 mm on the horizontal axis), the high illuminance range is elongated in the Y-axis direction and this causes the wavy portions in the illuminance distribution. It is presumed that it occurs because the first light exit unit prisms 228A in Example 4 are protrusion type prisms and light that is totally reflected by one of the sloped surfaces 228A1 of the first light exit unit prism 228A is totally reflected again by another one of the sloped surfaces 228A1 on the opposite side from the one sloped surface 228A1 with respect to the vertex and returned to the back side and the light is less likely to be diffused in the X-axis direction. On the other hand, since the first light exit unit prisms in Example 1 are recess type prisms, light that is totally reflected by the sloped surfaces of the first light exit unit prism travels in the X-axis direction and is totally reflected again by the sloped surfaces of the next first light exit unit prism and returned to the back side and the light is likely to be diffused in the X-axis direction. In Example 1, the high illuminance range has almost a perfect circular shape and the illumination distribution hardly includes a wavy portion. Comparing FIG. 19 with FIG. 17 that illustrates the experiment results of Experimental Demonstration 3, the Cm value in Example 4 is smaller than that in Example 3. Even though Example 4 includes the protrusion type first light exit unit prisms 228A, the backlight device of Example 4 includes the light diffusion prism portion 226 and therefore, luminance unevenness is effectively suppressed by the light diffusion effect of the light diffusion prism portion 226.

Fourth Embodiment

A fourth embodiment will be described with reference to FIGS. 20 and 21. The fourth embodiment differs from the first embodiment in a configuration of a second light exit lens portion 329. Configurations, operations, and effects that are similar to those of the first embodiment will not be described.

Figure 20:
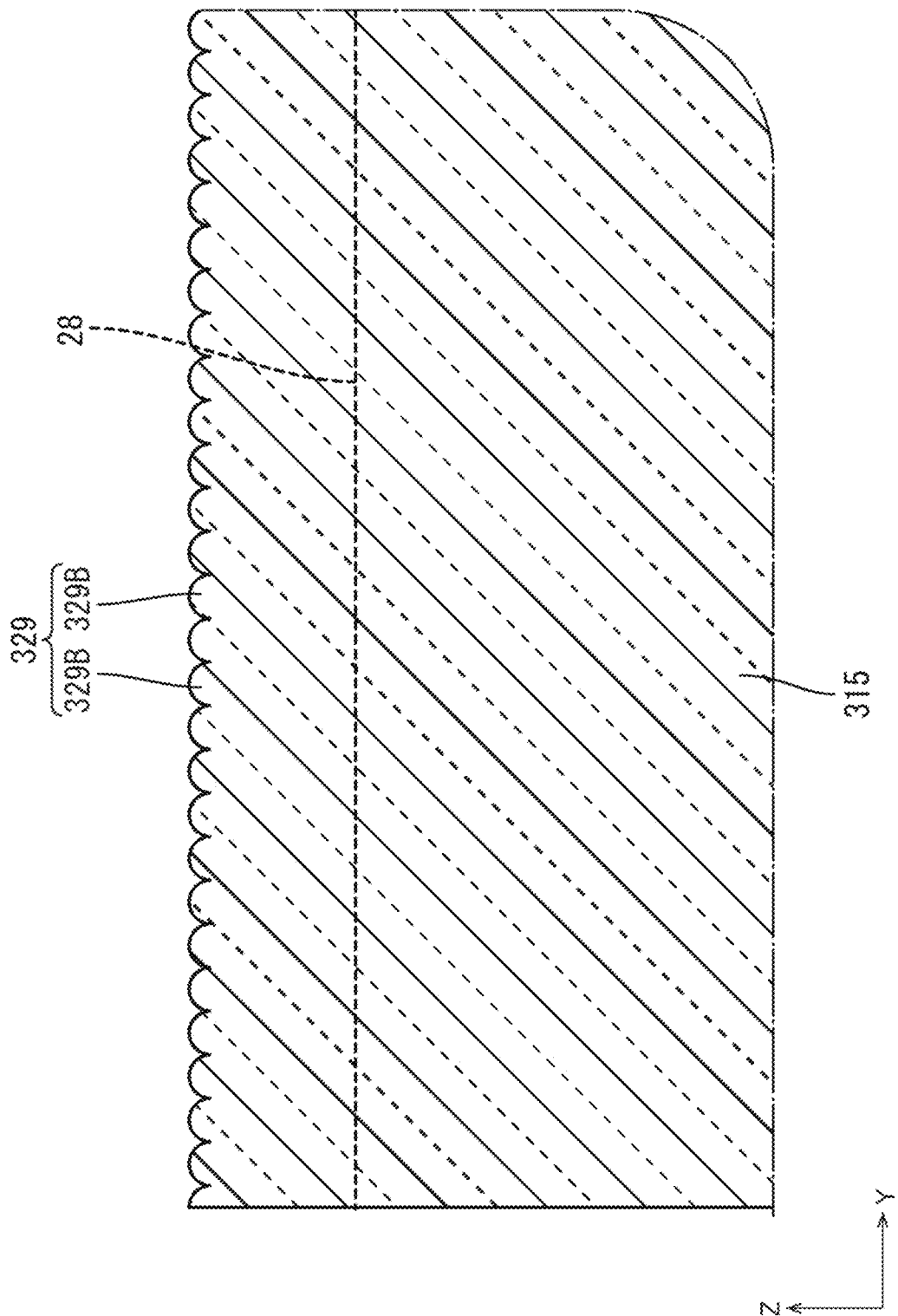
FIG. 20 is a cross-sectional view of a light guide plate according to a fourth embodiment taken along the Y-axis direction.
Figure 21:
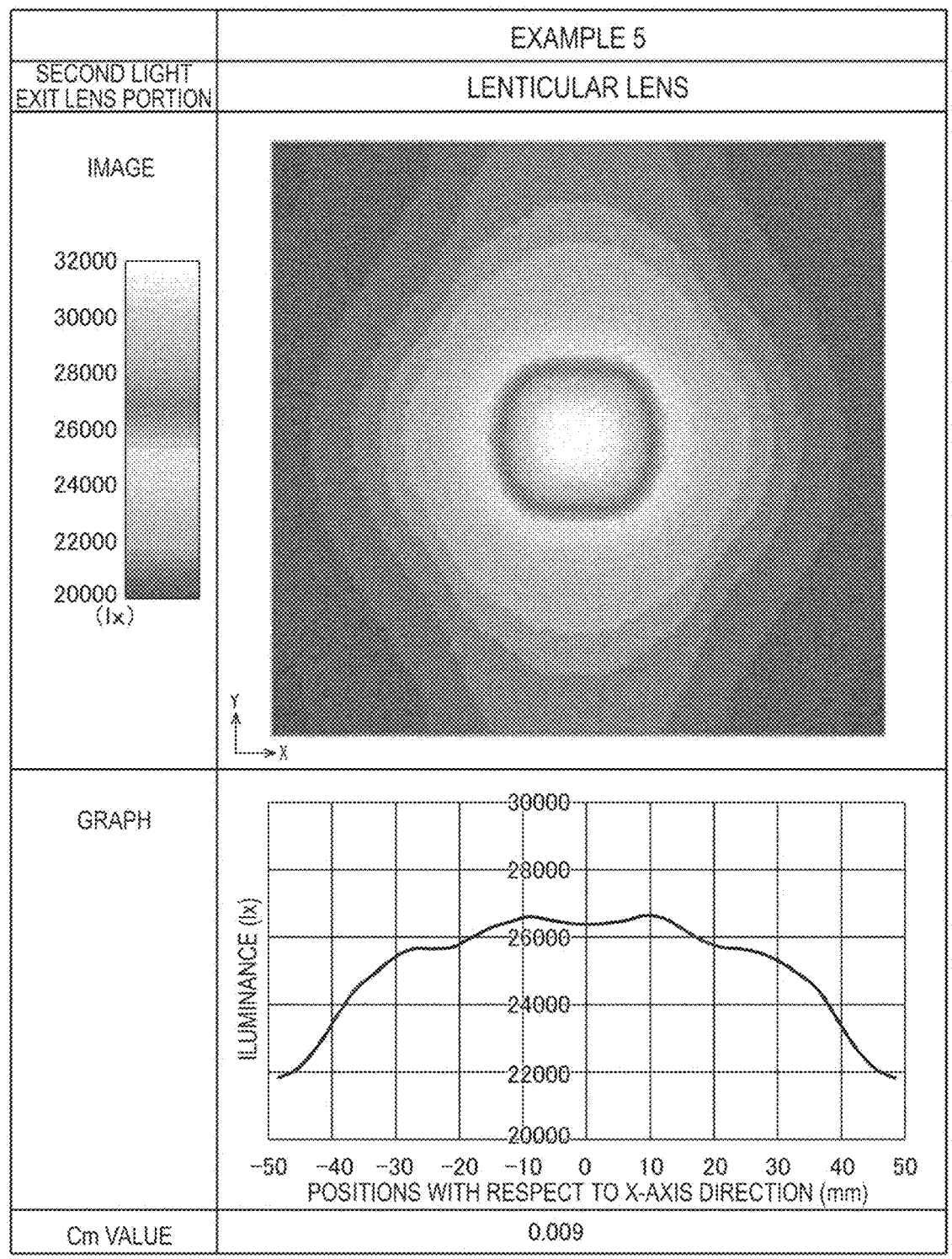
FIG. 21 is a Table illustrating experiment results of Example 5 according to Experimental Demonstration 5.

As illustrated in FIG. 20, a light guide plate 315 in this embodiment includes a second light exit lens portion 329 that is a lenticular lens. Specifically, the second light exit lens portion 329 includes second light exit unit cylindrical lenses 329B (second light exit unit lens) that extend in the X-axis direction and are arranged in the Y-axis direction.

Next, Experimental Demonstration 5 according to this embodiment was performed. In Experimental Demonstration 5, a backlight device including the lenticular lens as described before instead of the second light exit lens portion 329 of the light guide plate in Example 1 described in Comparative Experiment 1 is prepared as Example 5. The illuminance distribution of exit light was measured and Cm values were measured. Specifically, in Experimental Demonstration 5, the LEDs included in each of the LED rows are divided into groups (five groups, for example). The LEDs (twenty LEDs 13, for example) included in a middle group in the Y-axis direction of a LED row that is on a middle in the X-axis direction are selectively lighted and the LEDs included in other groups of the middle LED row and the LEDs included in other LED rows are not lighted. In such a state, an image that represents an illuminance distribution of the exit light rays was taken and illuminance of the exit light rays was measured and a graph relating the illuminance distribution was obtained and Cm values were measured. The experiment results are illustrated in FIG. 21. FIG. 21 illustrates the kind of the second light exit lens portion 329, the image showing the illuminance distribution of the exit light rays, the graph illustrating the illuminance distribution with respect to the X-axis direction, and the Cm value. The unit of illuminance represented by the vertical axis in a sample of the image and the graph in FIG. 21 is "lx". The horizontal axis of the graph in FIG. 21 represents positions with reference to a middle position in the X-axis direction as a reference position (0) and the unit thereof is "mm". The positive and negative symbols that are described on the horizontal axis of the graph in FIG. 21 represent the same as described in Comparative Experiment 1.

The experiment results of Experimental Demonstration 5 will be described. With reference to the image and the graph of FIG. 21, the illuminance distribution of Example 5 locally includes a bright portion of a point shape in a middle section with respect to the X-axis direction and the Y-axis direction. The bright portion is directly above the LEDs of the group in Example 5 that are selectively lighted. Comparing the image of FIG. 21 to the image of FIG. 14 that illustrates the experiment results of Experimental Demonstration 1, the illuminance range is elongated in the Y-axis direction near the LEDs of the group that are selectively lighted in the image of FIG. 21. Further, comparing the graph of FIG. 21 to the graph of FIG. 14, unevenness in brightness/darkness is caused in the illuminance depending on the position with respect to the X-axis direction in the graph of FIG. 21. It is presumed that it occurs because the second light exit lens portion 329 in Example 5 is a lenticular lens and light that is totally reflected by the second light exit unit cylindrical lens 329B is excessively diffused in the Y-axis direction. The second light exit lens portion of Example 1 includes second light exit unit prisms having the vertex angle of 90°. With such a configuration, the light that is totally reflected by the sloped surfaces of the second light exit unit prism is less likely to be diffused excessively in the Y-axis direction and a large amount of retro-reflection light rays are obtained and high mixing effect is obtained. The Cm value of Example 5 is greater than that of Example 1 but is an effectively low value.

Fifth Embodiment

A fifth embodiment will be described with reference to FIGS. 22 and 23. The fifth embodiment differs from the first embodiment in a configuration of a second light exit lens portion 429. Configurations, operations, and effects that are similar to those of the first embodiment will not be described.

Figure 22:
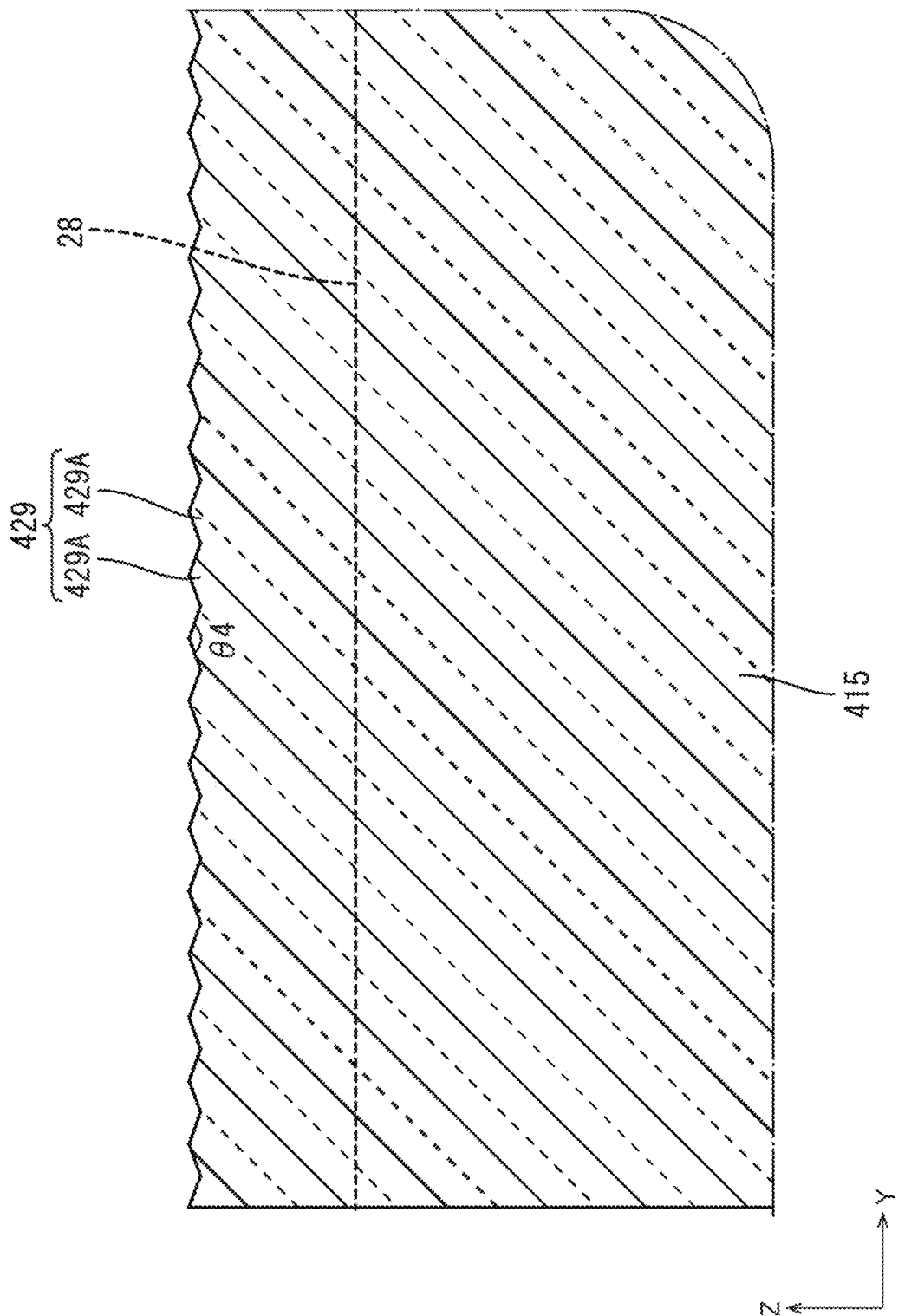
FIG. 22 is a cross-sectional view of a light guide plate according to a fifth embodiment taken along the Y-axis direction.
Figure 23:
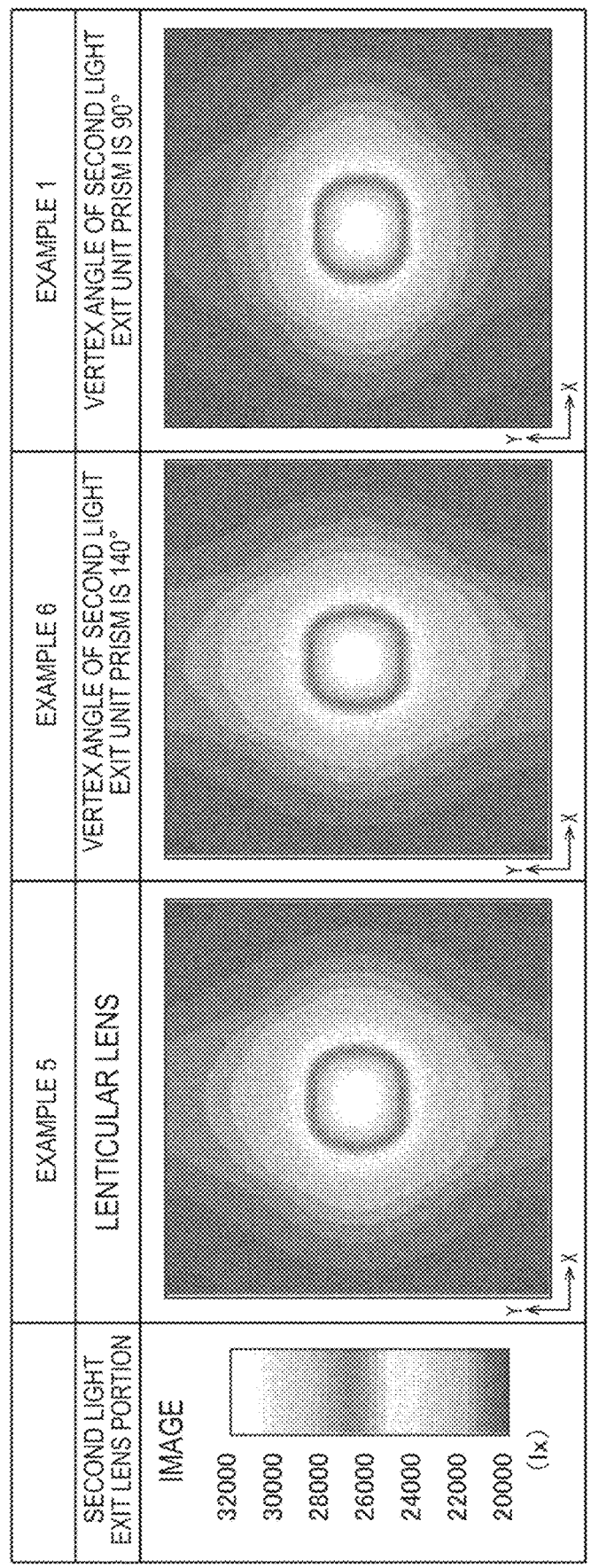
FIG. 23 is a Table illustrating experiment results of Examples 1, 5, 6 according to Experimental Demonstration 6.

As illustrated in FIG. 22, a light guide plate 415 in this embodiment includes a second light exit lens portion 429 that includes second light exit unit prisms 429A. The second light exit unit prism 429A has a vertex angle $\theta 4$ of 140°.

Next, Experimental Demonstration 6 according to this embodiment was performed. In Experimental Demonstration 6, a backlight device having the configuration of Example 1 described in Comparative Experiment 1 and including the second light exit unit prisms 429A having the vertex angle $\theta 4$ of 140° as described before instead of the second light exit lens portion 429 of the light guide plate in Example 1 is prepared as Example 6. The illuminance distribution of exit light was measured. Specifically, in Experimental Demonstration 6, the LEDs included in each of the LED rows are divided into groups (five groups, for example). The LEDs (twenty LEDs, for example) included in a middle group in the Y-axis direction of a LED row that is on a middle in the X-axis direction are selectively lighted and the LEDs included in other groups of the middle LED row and the LEDs included in other LED rows are not lighted. In such a state, an image that represents an illuminance distribution of the exit light rays was taken. The experiment results are illustrated in FIG. 23. FIG. illustrates the experiment results of Experimental Demonstrations 1 and 5. FIG. 23 illustrates kinds of the second light exit lens portions and the images showing the respective illuminance distributions of the exit light rays in the respective Examples 1, 5, and 6. The unit of illuminance represented in a sample of the images in FIG. 23 is "lx".

The experiment results of Experimental Demonstration 6 will be described. From the image of FIG. 23, the illuminance distribution of Example 6 locally includes a bright portion of a point shape in a middle section with respect to the X-axis direction and the Y-axis direction. The bright portion is directly above the LEDs of the group in Example 6 that are selectively lighted. Comparing Examples 1, 5, and 6, the image of Example 6 is similar to the image of Example 5 and the illuminance range is elongated in the Y-axis direction near the LEDs of the group that are selectively lighted in Example 6. This means that with the configuration that the vertex angle θ4 of the second light exit unit prism 329A is 140° like in Example 6, the light that has totally reflected tends to be diffused excessively in the Y-axis direction similar to the second light exit unit cylindrical lens. On the other hand, the second light exit lens portion of Example 1 includes the second light exit unit prisms having the vertex angle of 90°. With such a configuration, the light that is totally reflected by the sloped surfaces of the second light exit unit prism is less likely to be diffused excessively in the Y-axis direction and a large amount of retro-reflection light rays are obtained and high mixing effect is obtained.

Sixth Embodiment

A sixth embodiment will be described with reference to FIGS. 24 and 25. The sixth embodiment differs from the first embodiment such that the opposite sloped surfaces are not included. Configurations, operations, and effects that are similar to those of the first embodiment will not be described.

Figure 24:
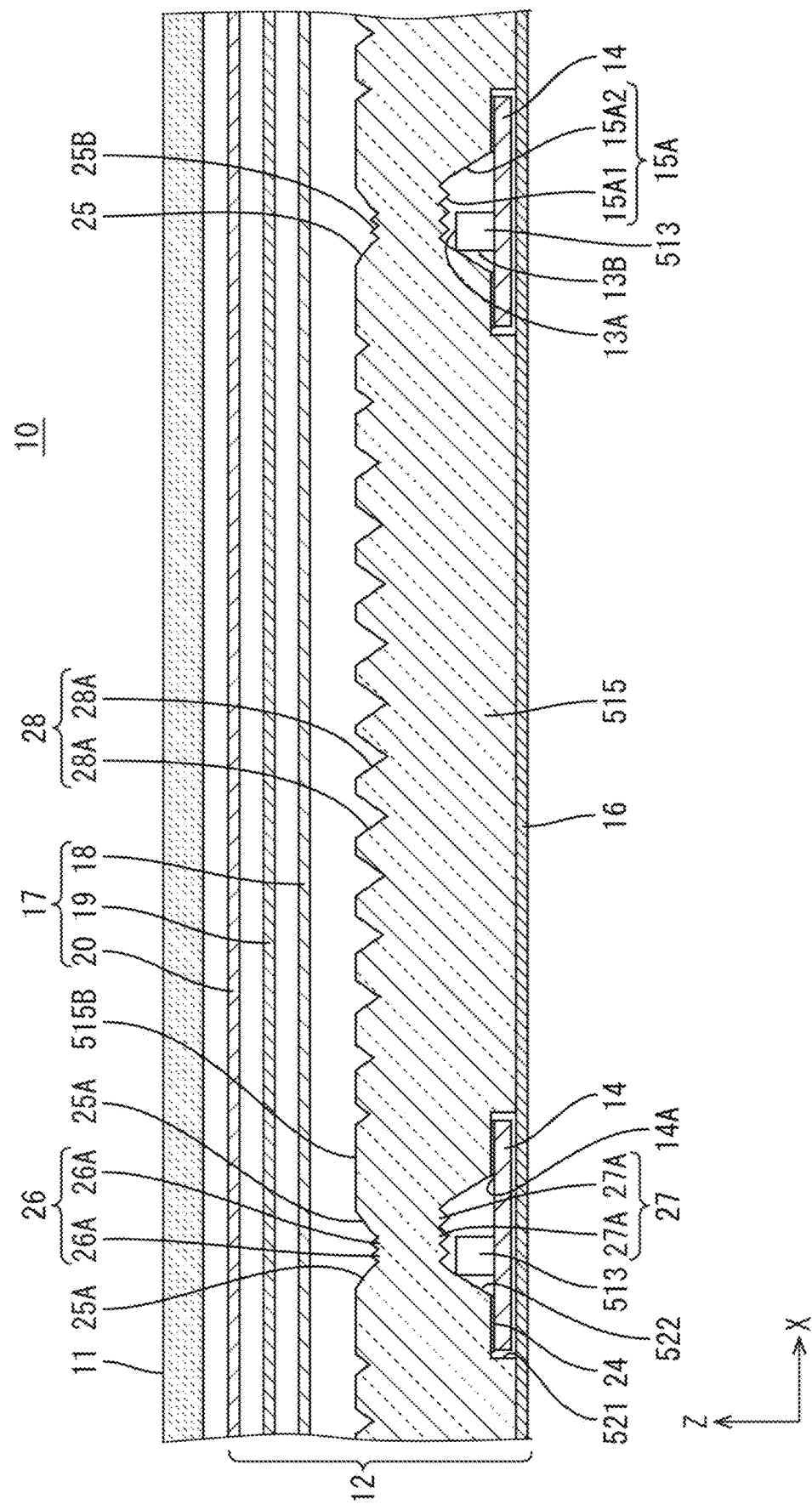
FIG. 24 is a cross-sectional view of a liquid crystal display device according to a sixth embodiment taken along the X-axis direction.
Figure 25:
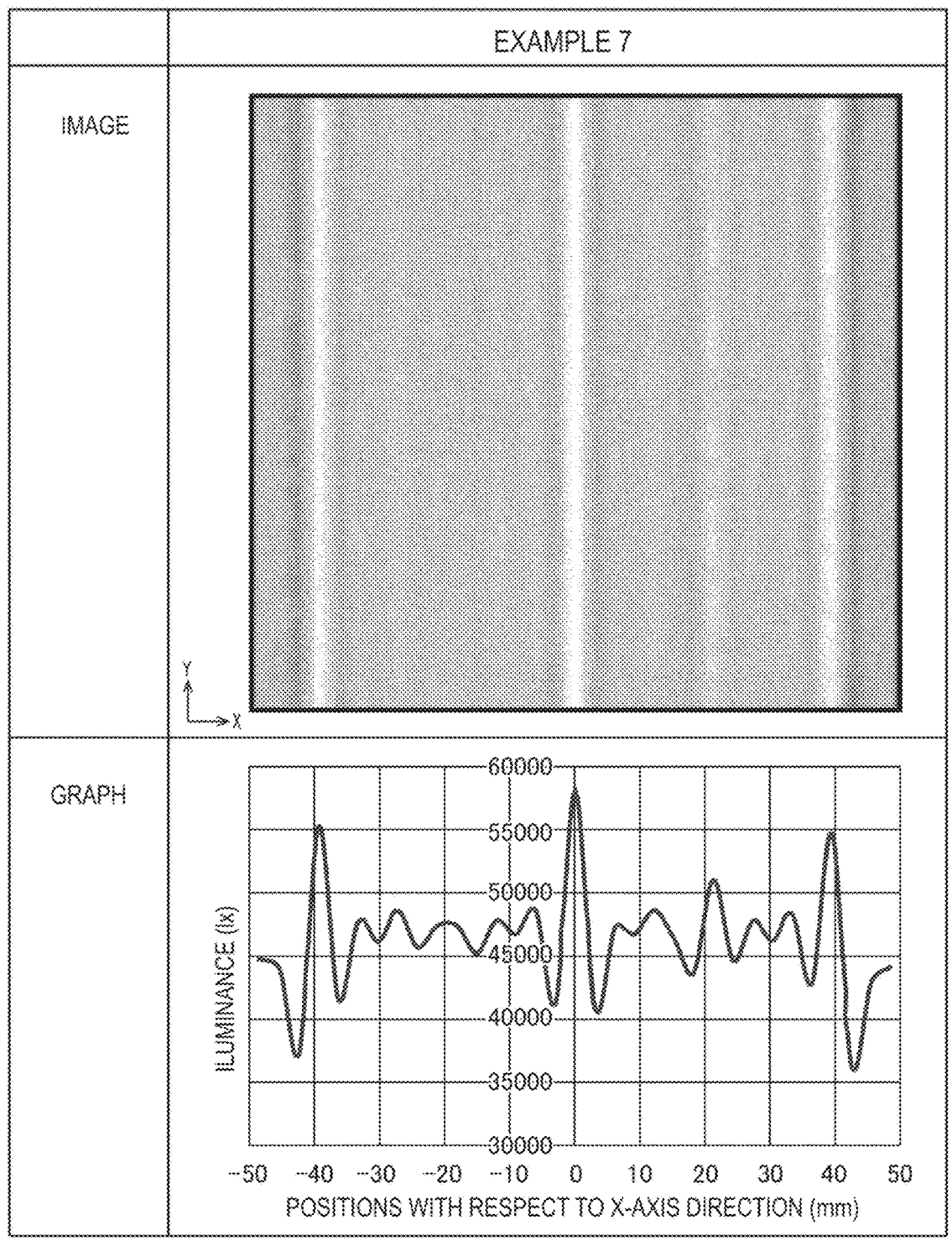
FIG. 25 is a Table illustrating experiment results of Example 7 according to Experimental Demonstration 7.

As illustrated in FIG. 24, a light guide plate 515 in this embodiment does not include opposite sloped surfaces on a plate surface opposite from a light exit surface 515B. Specifically, the light guide plate 515 includes flat surfaces that are parallel to an X-Y plane surface in portions of the back side plate surface where LED board housing recessed portions 521 and LED housing recessed portions 522 are not formed.

Next, Experimental Demonstration 7 according to this embodiment was performed. In Experimental Demonstration 7, a backlight device having the configuration of Example 1 described in Comparative Experiment 1 without including the optical sheets and the opposite sloped surfaces is prepared as Example 7. The illuminance distribution of exit light exiting the light guide plate 515 was measured. Specifically, in Experimental Demonstration 7, an image that represents an illuminance distribution of the exit light rays exiting the light guide plate 515 was taken while all of the LEDs 513 being lighted and illuminance of the exit light was measured and a graph relating the illuminance distribution was obtained. The experiment results are illustrated in FIG. 25. FIG. 25 illustrates the image showing the illuminance distribution of the exit light rays and the graph illustrating the illuminance distribution with respect to the X-axis direction. Although a sample is not attached to the image in FIG. 25, the density of the image is lowered as the illuminance tends to be higher and the density of the image is increased as the illuminance tends to be lower. The unit of illuminance represented by the vertical axis in the graph in FIG. 25 is "lx". The horizontal axis of the graph in FIG. 25 represents positions with reference to a middle position in the X-axis direction as a reference position (0) and the unit thereof is "mm". The positive and negative symbols that are described on the horizontal axis of the graph in FIG. 25 represent the same as described in Comparative Experiment 1.

The experiment results of Experimental Demonstration 7 will be described. With reference to the image and the graph of FIG. 25, the illuminance distribution has large unevenness since the optical sheets and the opposite sloped surfaces are not included. Specifically, the light guide plate includes bright portions on the portions overlapping the LEDs 513 included in the middle LED row and edge-side two LED rows (at the positions of −40 mm, 0 mm, 40 mm on the lateral axis) and the bright portions have higher illuminance than the portions that do not overlap the LEDs 513. FIG. 25 is compared to FIG. 15 that illustrates the experiment results of Experimental Demonstration 2. Comparing the images and the graphs of FIGS. 15 and 25, difference in the illuminance between the bright portion and the dark portion is larger in Example 7 than Example 2. It is presumed that it occurs because the light exit acceleration effect by the opposite sloped surfaces is not obtained in Example 7 and the light is more likely to exit through the particular portions of the light exit surface 515B with respect to the X-axis direction and the light is suppressed from exiting through other portions. Compared to Example 7, the light can travel upward due to the opposite sloped surfaces such that the light exit through the light exit surface evenly within the plane surface thereof with respect to the X-axis direction in Example 1.

Seventh Embodiment

A seventh embodiment will be described with reference to FIGS. 26 and 27. The seventh embodiment differs from the first embodiment in the number of LED boards 614. Configurations, operations, and effects that are similar to those of the first embodiment will not be described.

Figure 26:
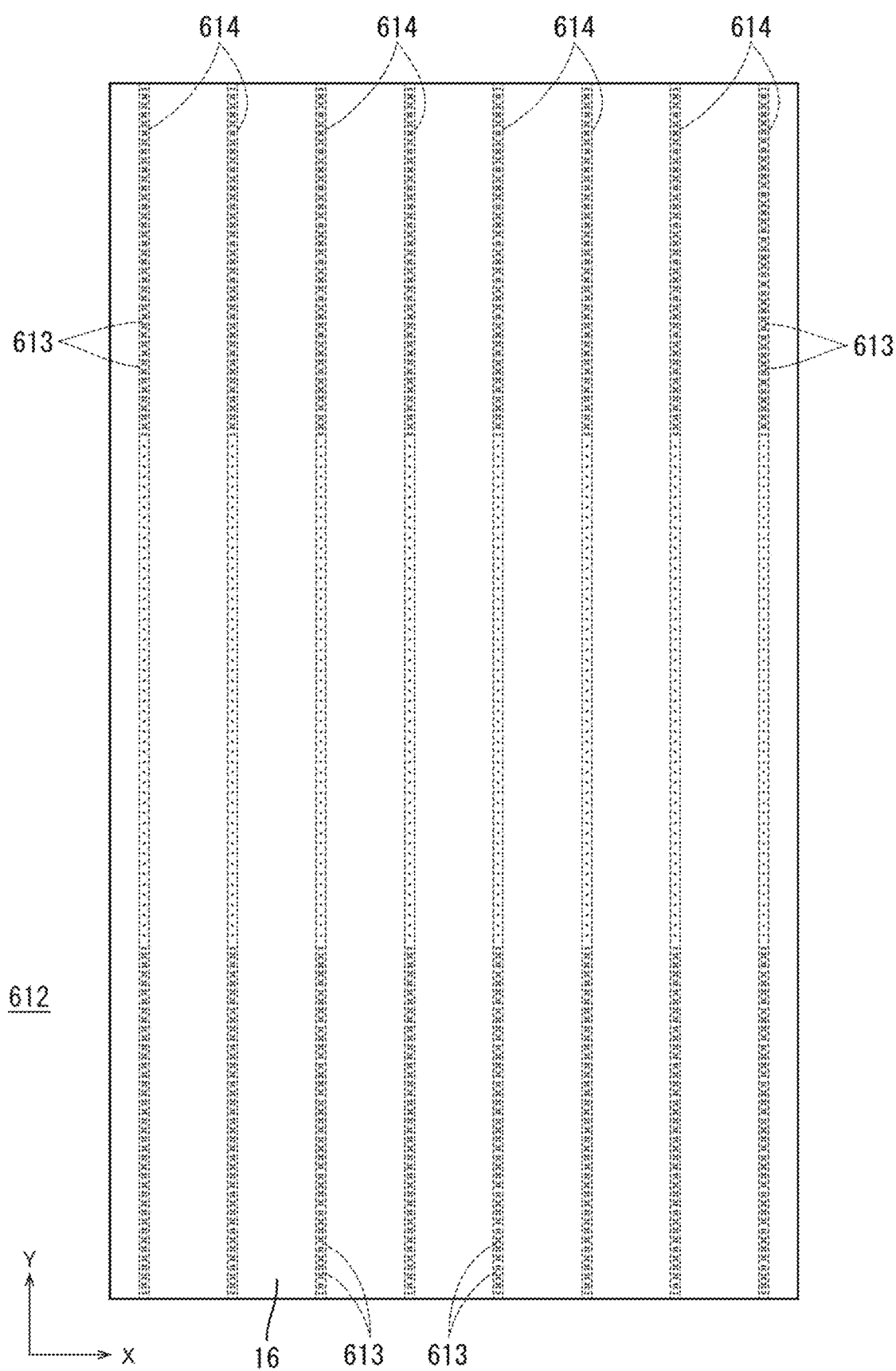
FIG. 26 is a bottom view of a backlight device according to a seventh embodiment.

As illustrated in FIG. 26, a backlight device 612 according to the present embodiment includes eight LED boards 614. Specifically, the backlight device 612 is disposed such that the long-side direction and the short-side direction correspond to the Y-axis direction and the X-axis direction, respectively, and the long-side dimension is about 344 mm and the short-side dimension is about 194 mm, for example. The liquid crystal panel disposed on the backlight device 612 has a screen size of about 15 inches. Eight LED boards 614 are arranged at substantially equal intervals with respect to the X-axis direction within the backlight device 612. Each of the LED boards 614 includes 320 LEDs 613 that are arranged in a row along the Y-axis direction. The interval between the rows of LEDs 613 and the LED boards 614 in the X-axis direction is about 24.5 mm, for example. A unit light emission area (a segment) for performing the local dimming control and the HDR control preferably has a X-axis dimension of about 24.5 mm and a Y-axis dimension of about 21.5 mm, for example. In such a configuration, the light exit surface of the backlight device 612 is divided into eight sections in the X-axis direction and sixteen sections in the Y-axis direction and divided into 128 unit light emission areas in total.

Next, Comparative Experiment 5 according to this embodiment was performed. In Comparative Experiment 5, a backlight device having the configuration of the backlight device 612 described before is prepared as Example 8 and a backlight device having the same outline dimension as that of Example 8 but not having the light guide plate is prepared as Comparative Example 3. In Comparative Example 3, the number of LED boards, the number of LEDs mounted on each LED board, and the thickness of the whole backlight device are adjusted such that the display quality is similar to that of Example 8 when the liquid crystal panel is mounted thereon. Comparative Experiment 5 demonstrates how the total number of LEDs, the whole thickness, and light use efficiency are determined in Comparative Example 3 that does not include the light guide plate to obtain the display quality similar to that of Example 8. The experiment results of Comparative Experiment 5 are illustrated in FIG. 27. The table in FIG. 27 illustrates the total number of LEDs, the thickness of the backlight device, the light use efficiency, and the display quality in each of Comparative Example 3 and Example 8. Next, the experiment results of Comparative Experiment 5 will be described. In Comparative Example 3, the total number of LEDs is great and is about nine times of that of Example 8 and the light use efficiency is lower than that of Example 8 by 8%. Furthermore, the thickness of the backlight device of Comparative Example 3 is greater than that of Example 8 by about 15%. This may be caused because the light diffusion effects by the light guide plate cannot be obtained in Comparative Example 3 and a great amount of LEDs are necessary to be arranged to obviate luminance unevenness that directly influences the display quality and the thickness of the backlight device is also necessary to be increased in Comparative Example 3. On the other hand, in Example 8, since the light guide plate provides light diffusion effects and luminance unevenness is greatly suppressed, the number of LEDs and LED boards can be greatly reduced and the backlight device and the liquid crystal display device can be reduced in thickness. Further, the light use efficiency is good in Example 8 and power consumption is preferably reduced.

Eighth Embodiment

An eighth embodiment will be described with reference to FIG. 28. The eighth embodiment has the configuration of first embodiment but does not include the LED board housing recessed portion and the LED housing recessed portion. Configurations, operations, and effects that are similar to those of the first embodiment will not be described.

Figure 28:
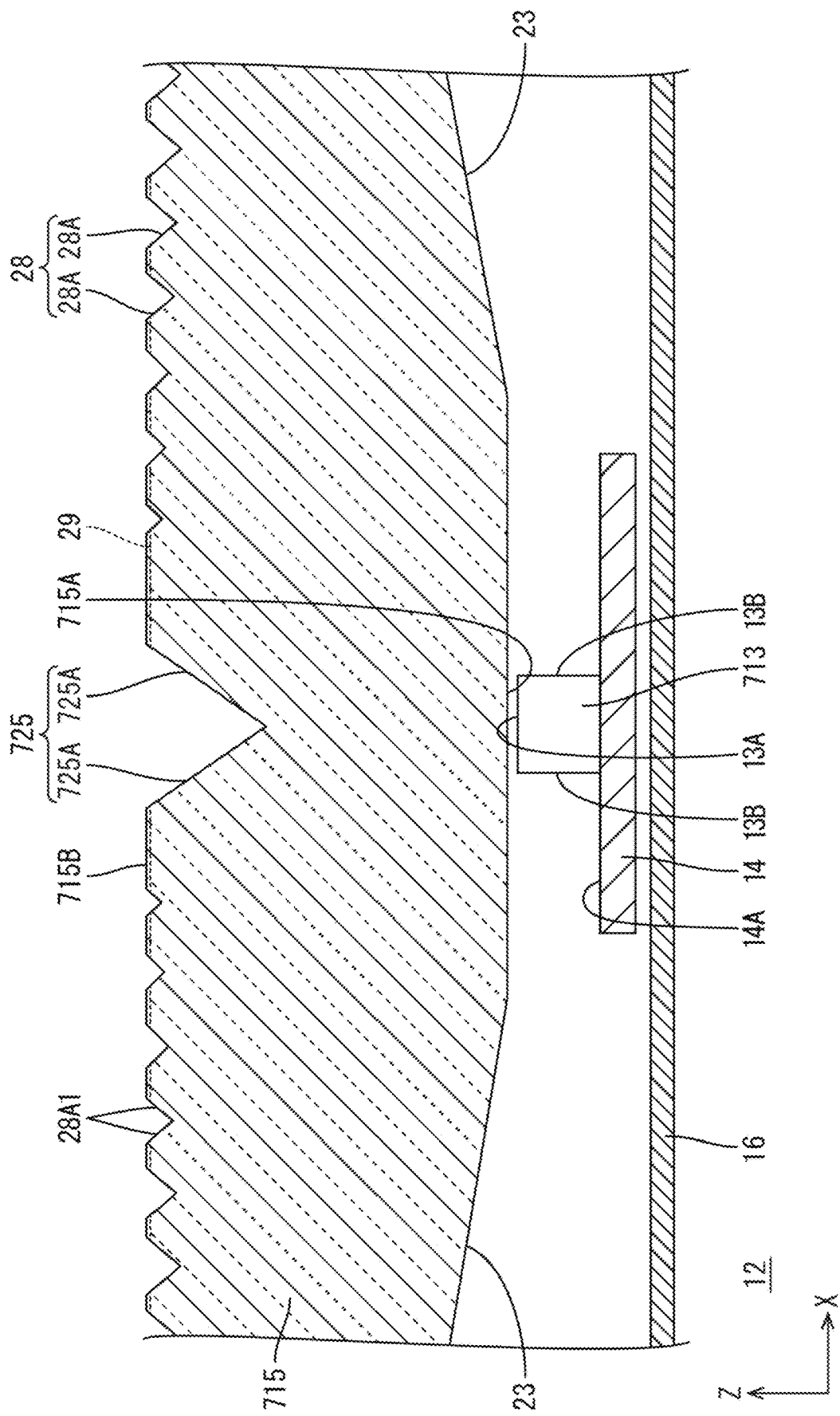
FIG. 28 is a cross-sectional view illustrating an LED, an LED board, and a light guide plate included in a backlight device according to an eighth embodiment and taken along the X-axis direction.

As illustrated in FIG. 28, a light guide plate 715 in this embodiment does not include the LED board housing recessed portion and the LED housing recessed portion, which is described in the first embodiment, on a plate surface opposite from a light exit surface 715B. A back-side plate surface of the light guide plate 715 includes a portion where opposite sloped surfaces 723 are not provided (including a light entering surface 715A). The portion without having the opposite sloped surfaces 723 is a flat surface that is parallel to the X-axis direction and the Y-axis direction. LEDs 713 are arranged on a back side of the light entering surface 715A of the light guide plate 715 so as to be spaced from the light entering surface 715A by a small distance. According to such a configuration of the light guide plate 715, the light guide plate 715 includes a light diffusion portion 725 that is recessed to have a V-shaped cross sectional shape taken along the X-axis direction. Thus, the light diffusion portion 725 includes a pair of light exit sloped surfaces 725A as an entire inner surface thereof. Most of the light rays that have been emitted by the LEDs 713 and entered the light guide plate 715 through the light entering surface 715A reach the pair of light exit sloped surfaces 725A of the light diffusion portion 725 and are totally reflected by the light exit sloped surfaces 725A and diffused in a direction to be away from the LEDs 713 in the X-axis direction. This suppresses luminance unevenness similar to the first embodiment.

Other Embodiments

The present technology is not limited to the embodiments described above with reference to the drawings. The following embodiments may be included in the technical scope.

(1) Each of the light diffusion portions 25, 125, 225, 725 may include non-straight shaped light reflecting surfaces such as an arched surface instead of the light exit sloped surfaces 25A, 725A.

(2) Each of the light diffusion portions 25, 125, 225, 725 may be configured by a protrusion on the light exit surface 15B, 115B, 215B, 515B, 715B of the light guide plate 15, 115, 215, 315, 415, 515, 715.

(3) Each of the light diffusion portions 25, 125, 225, 725 may be configured by applying material different from that of the light guide plate 15, 115, 215, 315, 415, 515, 715 on the light exit surface 15B, 115B, 215B, 515B, 715B. Each of the light diffusion portions 25, 125, 225, 725 may be configured in any form as long as the light diffusion portion 25, 125, 225, 725 extends in the Y-axis direction and adds the diffusion action to the light that is within the light guide plate 15, 115, 215, 315, 415, 515, 715 to travel in the X-axis direction to be away from the LEDs 13, 113, 213, 513, 613, 713.

(4) A light diffusion lens portion of a lenticular lens may be included instead of the light diffusion prism portion 26, 226. In such a configuration, the light diffusion lens portion includes light diffusion unit cylindrical lenses that extend in the Y-axis direction.

(5) A light entering lens portion of a lenticular lens may be included instead of the light entering prism portion 27, 127, 227. In such a configuration, the light entering lens portion includes light entering unit cylindrical lenses that extend in the Y-axis direction.

(6) The light entering prism portion 27, 127, 227 may not be included.

(7) A first light exit lens portion of a lenticular lens may be included instead of the first light exit prism portion 28, 228. In such a configuration, the first light exit lens portion includes first light exit unit cylindrical lenses that extend in the Y-axis direction.

(8) The first light exit prism portion 28, 228 may not be included.

(9) The second light exit lens portion 29, 329, 429 may not be included.

(10) In the light guide plate 15, 115, 215, 315, 415, 515, 715, the LED housing recessed portion 22, 122, 522 may not configured such that a center of the LED housing recessed portion 22, 122, 522 may not be off from a center of the LED 13, 113, 213, 513, 613, 713. A center of the LED housing recessed portion 22, 122, 522 with respect to the X-axis direction may be on the same position as a center of the LED 13, 113, 213, 513, 613, 713 with respect to the X-axis direction.

(11) The number of LED boards 14, 614 and the interval between the LED boards 14, 614 may be altered as necessary.

(12) Multiple LED rows may be arranged on the mount surface 14A of each LED board 14, 614.

(13) The specific number of or the specific interval between the LEDs 13, 113, 213, 513, 613, 713 included in the row mounted on the LED board 14, 614 may be altered as necessary.

(14) The specific shape and the specific outer dimension of the LED 13, 113, 213, 513, 613, 713 may be altered as necessary.

(15) The LEDs 13, 113, 213, 513, 613, 713 may be chip scale package (CSP) type LEDs.

(16) The LED 13, 113, 213, 513, 613, 713 may emit light through a top surface and may not emit through side surfaces. The LED may emit light through a side surface and may not emit through a top surface.

(17) The reflection sheet 16 may be made of synthetic resin as a whole and have a white surface having good light reflection properties. The reflection sheet 16 may include a synthetic resin base member and metal such as silver disposed on a surface of the base member with deposition and has a silver surface having good light reflection properties.

(18) The specific number, the specific disposing order, the specific kind of the optical sheets 17 may be altered as necessary.

(19) The light source may be LEDs that emit light other than blue. In such a configuration, the color of light that is emitted by the phosphor included in the wavelength conversion sheet 18 may be altered according to the color of light emitted by the LED. For example, when using the LEDs emitting magenta light, the wavelength conversion sheet 18 may include green phosphors emitting light of green that is a complementary color of magenta. Thus, the backlight device 12, 30, 612 can exit white light (exit light).

(20) Other than the configuration of (19), when using the LEDs emitting purple light, the wavelength conversion sheet 18 may include green phosphors and yellow phosphors so as to emit light of yellowish green that is a complementary color of purple. Thus, the backlight device 12, 30, 612 can exit white light (exit light).

(21) Other than the configurations of (19) and (20), when using the LEDs emitting cyan light, the wavelength conversion sheet 18 may include red phosphors emitting light of red that is a complementary color of cyan. Thus, the backlight device 12, 30, 612 can exit white light (exit light).

(22) The wavelength conversion sheet 18 may be configured to include only yellow phosphors as the phosphor but may be configured to include red phosphors and green phosphors in addition to the yellow phosphors.

(23) The wavelength conversion sheet 18 may include other kinds of phosphors than the quantum dot phosphors. Other kinds of phosphors included in the wavelength conversion sheet 18 may be sulfide phosphors but are not limited thereto.

(24) The optical sheets 17 may not include the wavelength conversion sheet 18. In such a configuration, the LED, which is a light source, is configured to emit white light. Such a LED that emits white light preferably includes at least a blue LED chip emitting blue light and sealing material that includes a green phosphor and a red phosphor that emit green light and red light, respectively, when excited by the blue light emitted by the LED chip. However, the configuration is not limited to this. Instead of the wavelength conversion sheet 18, a diffuser sheet for diffusing light is preferably included but may not be included.

(25) The light source may not be the LED 13, 113, 213, 513, 613, 713 but may be an organic EL element or a laser diode.

(26) The display panel may not be the liquid crystal panel 11 but may be another kind of a display panel (such as a micro electro mechanical system (MEMS) display panel).

The invention claimed is:

1. A lighting device comprising:
   light sources arranged in a row in an arrangement direction;
   a light guide plate disposed to cover the light sources and including a plate surface facing the light sources and an opposite plate surface being opposite from the plate surface, a portion of the plate surface being a light entering surface through which light emitted by the light sources enters, and the opposite plate surface being a light exit surface through which the light exits; and
   a light diffusion portion extending in the arrangement direction of the light sources and on the light exit surface such that a portion of the light diffusion portion overlaps the light sources, the light diffusion portion applying a diffusion effect to light that is within the light guide plate so as to travel in a direction crossing the arrangement direction and to be away from the light sources seen from a normal direction of the light exit surface, wherein
   the light diffusion portion includes a recess on the light exit surface and the recess includes an inner surface including a light exit sloped surface that is sloped obtusely with respect to the light exit surface.

2. The lighting device according to claim 1, wherein
   the inner surface of the light diffusion portion includes a bottom surface that is continuous to a bottom side end of the sloped surface, and
   the light diffusion portion includes a light diffusion prism portion including light diffusion unit prisms on the bottom surface, and the light diffusion unit prisms extend in the arrangement direction and are arranged in the direction crossing the arrangement direction seen from the normal direction of the light exit surface.

3. The lighting device according to claim 2, wherein the light diffusion prism portion is configured such that each of the light diffusion unit prisms has a vertex angle of between 45° and 115°, inclusive.

4. The lighting device according to claim 1, wherein
   the light guide plate includes a light source housing recessed portion on the plate surface facing the light sources and the light source housing recessed portion extends in the arrangement direction and the light sources are arranged in the light source housing recessed portion, and
   the light entering surface is a portion of an inner surface of the light source housing recessed portion.

5. The lighting device according to claim 4, wherein
   each of the light sources has a light emitting side surface through which light is emitted and that extends along a plate thickness direction of the light guide plate, and
   the light source housing recessed portion includes a light entering sloped surface on the inner surface and the light entering sloped surface is sloped with respect to the plate thickness direction such that the light source housing recessed portion becomes narrower as the light entering sloped surface extends closer to the light exit surface in the plate thickness direction and the light entering sloped surface is opposite the light emitting side surface and is a portion of the light entering surface.

6. The lighting device according to claim 5, wherein
   each of the light sources includes a light emitting top surface through which the light is emitted and that crosses the light emitting side surface and is closer to the light exit surface than the light emitting side surface is with respect to the plate thickness direction,
   the light source housing recessed portion includes a light entering top surface on the inner surface and the light entering top surface is opposite the light emitting top surface, and the light source housing recessed portion includes a light entering prism portion on the light entering top surface and the light entering prism portion includes light entering unit prisms that extend along the arrangement direction and are arranged in a crossing direction crossing the arrangement direction seen from the normal direction of the light exit surface.

7. The lighting device according to claim 6, wherein the light entering prism portion is configured such that each of the light entering unit prisms has a vertex angle of between 75° and 85°, inclusive.

8. A lighting device comprising:
light sources arranged in a row in an arrangement direction;
a light guide plate disposed to cover the light sources and including a plate surface facing the light sources and an opposite plate surface being opposite from the plate surface, a portion of the plate surface being a light entering surface through which light emitted by the light sources enters, and the opposite plate surface being a light exit surface through which the light exits; and
a light diffusion portion extending in the arrangement direction of the light sources and on the light exit surface such that a portion of the light diffusion portion overlaps the light sources, the light diffusion portion applying a diffusion effect to light that is within the light guide plate so as to travel in a direction crossing the arrangement direction and to be away from the light sources seen from a normal direction of the light exit surface, wherein
the light guide plate includes a light source housing recessed portion on the plate surface facing the light sources and the light source housing recessed portion extends in the arrangement direction and the light sources are arranged in the light source housing recessed portion,
the light entering surface is a portion of an inner surface of the light source housing recessed portion,
a portion of the inner surface of the light source housing recessed portion is in contact with a portion of the light sources such that the light source housing recessed portion positions the light guide plate with respect to the light sources in a crossing direction that crosses the arrangement direction seen from the normal direction of the light exit surface, and
the light diffusion portion is arranged such that a center of the light diffusion portion is on a same position as a center of the light sources that are in contact with the portion of the inner surface of the light source housing recessed portion with respect to the crossing direction.

9. A lighting device comprising:
light sources arranged in a row in an arrangement direction;
a light guide plate disposed to cover the light sources and including a plate surface facing the light sources and an opposite plate surface being opposite from the plate surface, a portion of the plate surface being a light entering surface through which light emitted by the light sources enters, and the opposite plate surface being a light exit surface through which the light exits;
a light diffusion portion extending in the arrangement direction of the light sources and on the light exit surface such that a portion of the light diffusion portion overlaps the light sources, the light diffusion portion applying a diffusion effect to light that is within the light guide plate so as to travel in a direction crossing the arrangement direction and to be away from the light sources seen from a normal direction of the light exit surface; and
a first light exit prism portion included on the light exit surface of the light guide plate so as not to overlap the light diffusion portion and including first light exit unit prisms that extend in the arrangement direction and are arranged in a direction crossing the arrangement direction seen from the normal direction of the light exit surface.

10. The lighting device according to claim 9, wherein the first light exit unit prims are arranged at arrangement intervals and each of the arrangement intervals is greater than a width dimension of each of the first light exit unit prisms and the first light exit unit prisms are configured with a recessed form on the light exit surface.

11. The lighting device according to claim 9, further comprising:
a second light exit lens portion included on the light exit surface of the light guide plate so as not to overlap the light diffusion portion and including second light exit unit lenses that extend in the direction crossing the arrangement direction seen from the normal direction of the light exit surface and are arranged in the arrangement direction.

12. The lighting device according to claim 11, wherein
the first light exit unit prisms of the first light exit prism portion are configured with a recessed form on the light exit surface, and
the second light exit unit lenses of the second light exit lens portion are configured with a recessed form on the light exit surface and each of the second light exit unit lenses has a width dimension that is smaller than that of each of the first light exit unit prisms.

13. The lighting device according to claim 11, wherein the second light exit unit lenses of the second light exit lens portion include second light exit unit prisms and each of the second light exit unit prisms has a vertex angle of between 75° and 90°, inclusive.

14. A display device comprising:
the lighting device according to claim 9; and
a display panel displaying images using light from the lighting device.

* * * * *